United States Patent
Calayir et al.

(10) Patent No.: US 11,402,687 B2
(45) Date of Patent: Aug. 2, 2022

(54) DISPLAY BACKLIGHTING SYSTEMS WITH CANCELLATION ARCHITECTURE FOR CANCELING GHOSTING PHENOMENA

(71) Applicant: Apple Inc., Cupertino, CA (US)

(72) Inventors: Vehbi Calayir, San Jose, CA (US); James E. Brown, San Jose, CA (US); Bret Rothenberg, Los Altos, CA (US)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 16/897,100

(22) Filed: Jun. 9, 2020

(65) Prior Publication Data

US 2021/0018795 A1 Jan. 21, 2021

Related U.S. Application Data

(60) Provisional application No. 62/875,911, filed on Jul. 18, 2019.

(51) Int. Cl.

| | |
|---|---|
| *H05B 45/10* | (2020.01) |
| *H05B 41/00* | (2006.01) |
| *G02F 1/13357* | (2006.01) |
| *H05B 45/325* | (2020.01) |
| *H05B 45/3725* | (2020.01) |
| *G02F 1/1335* | (2006.01) |

(52) U.S. Cl.
CPC ....... *G02F 1/133603* (2013.01); *H05B 45/10* (2020.01); *H05B 45/325* (2020.01); *H05B 45/3725* (2020.01); *G02F 1/133612* (2021.01)

(58) Field of Classification Search
CPC ......... G02F 1/133603; G02F 1/133612; H05B 45/3725; H05B 45/325; H05B 45/10
See application file for complete search history.

(56) References Cited

U.S. PATENT DOCUMENTS

| | | | |
|---|---|---|---|
| 8,941,697 B2* | 1/2015 | Nathan | G09G 3/325 345/690 |
| 9,047,810 B2 | 6/2015 | Li et al. | |
| 9,875,690 B2 | 1/2018 | Wang et al. | |
| 10,201,049 B1* | 2/2019 | Xie | G09G 3/342 |
| 2005/0012736 A1* | 1/2005 | Uchino | G09G 3/3208 345/211 |
| 2016/0275863 A1* | 9/2016 | Kimura | G09G 3/3233 |
| 2017/0263183 A1* | 9/2017 | Lin | G09G 3/3233 |
| 2018/0061311 A1* | 3/2018 | Lin | G09G 3/3291 |

FOREIGN PATENT DOCUMENTS

CN 104091568 A 10/2014

\* cited by examiner

*Primary Examiner* — Minh D A
(74) *Attorney, Agent, or Firm* — Aikin & Gallant, LLP

(57) ABSTRACT

Aspects of the subject technology relate to an electronic device with a display. The display includes a first array of light-emitting diodes of a backlight unit to generate backlight for the display with each LED including an anode and a cathode. A first switch selectively couples a power supply voltage to a common anode of the first array of LEDs to control illumination of the first array of LEDs. A first discharge switch selectively couples a first voltage level to the common anode of the first array of LEDs to discharge the common anode to prevent an undesired current path through the first array of LEDs and associated undesired illumination.

22 Claims, 19 Drawing Sheets

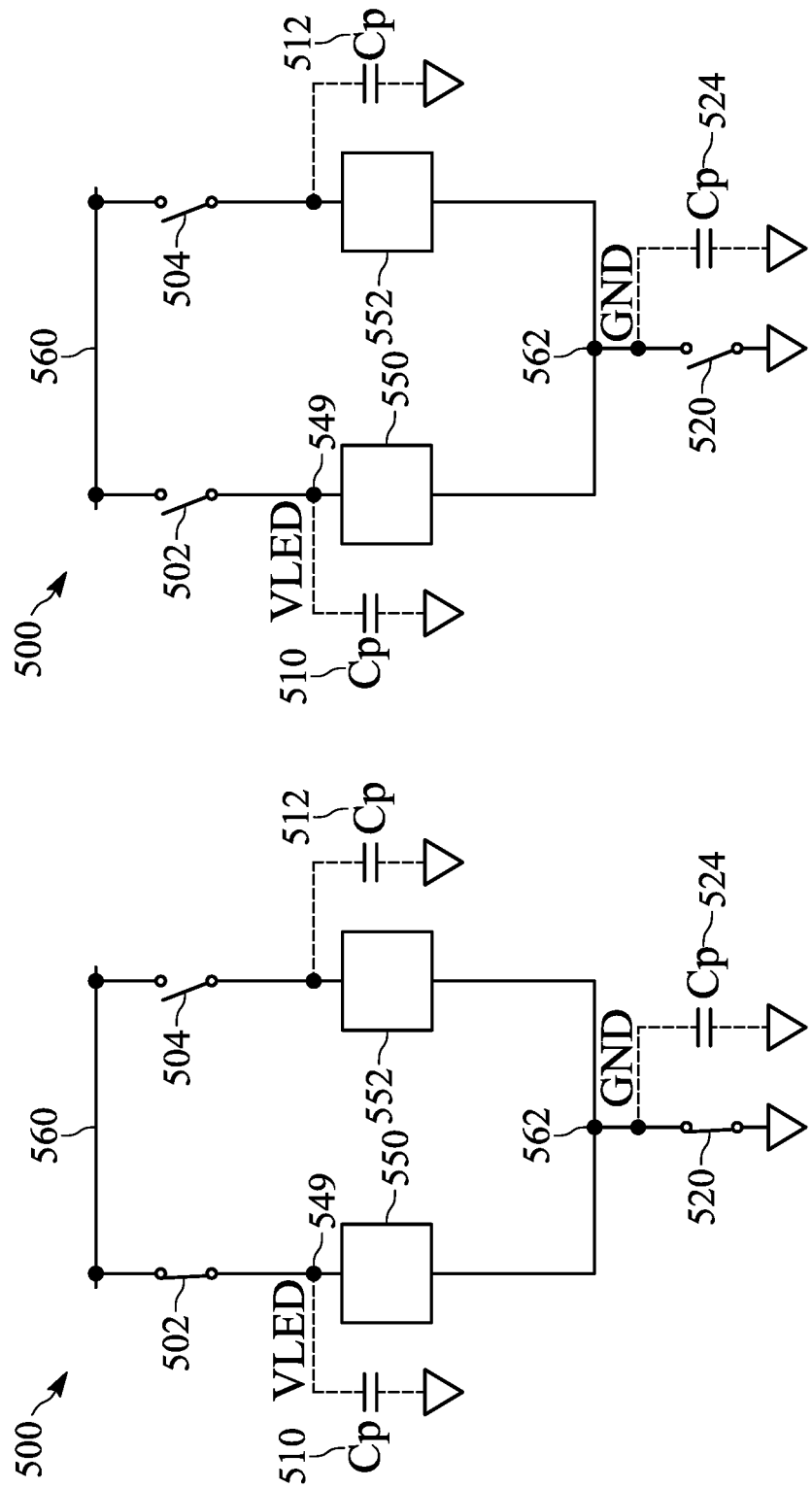

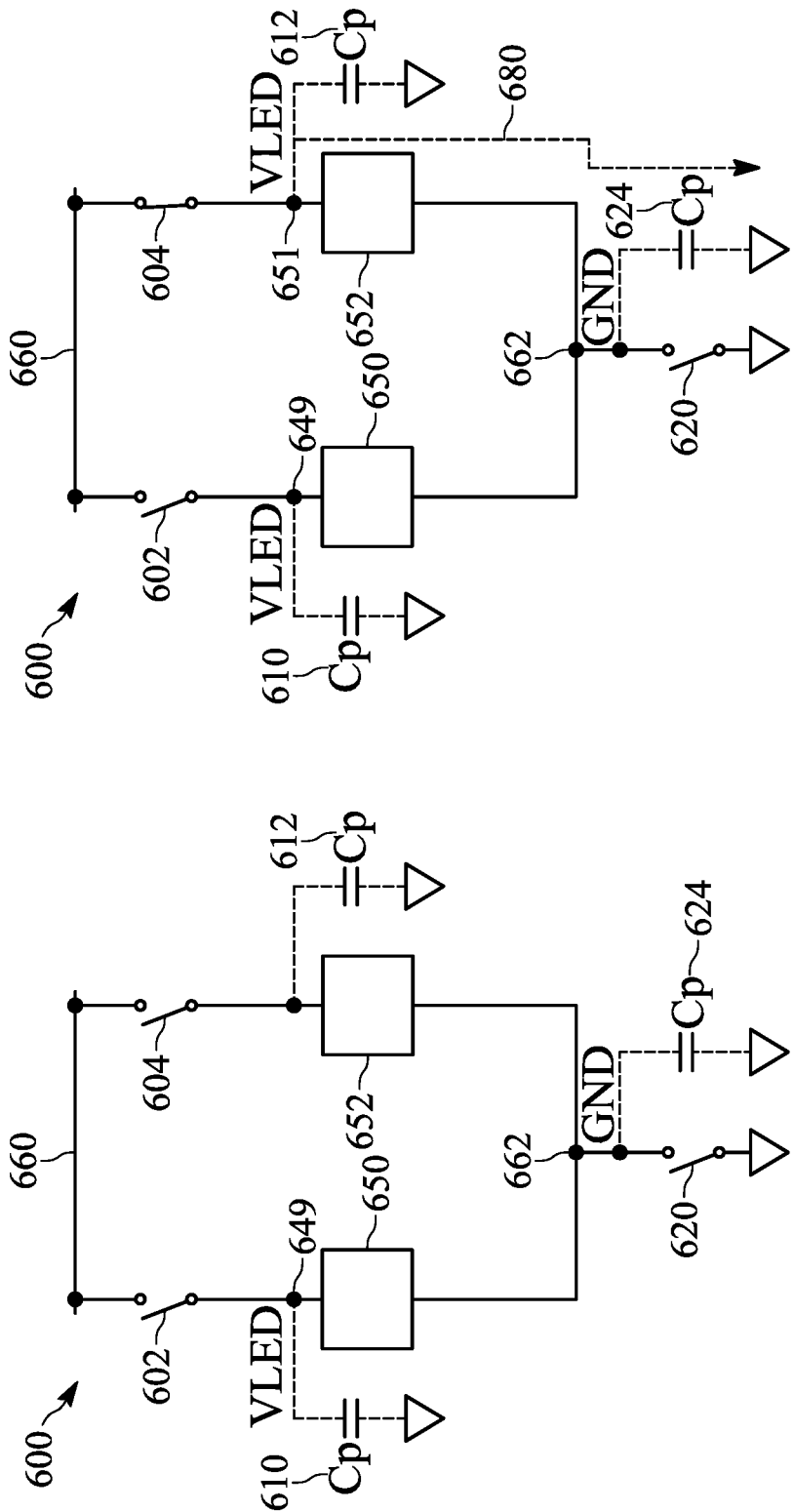

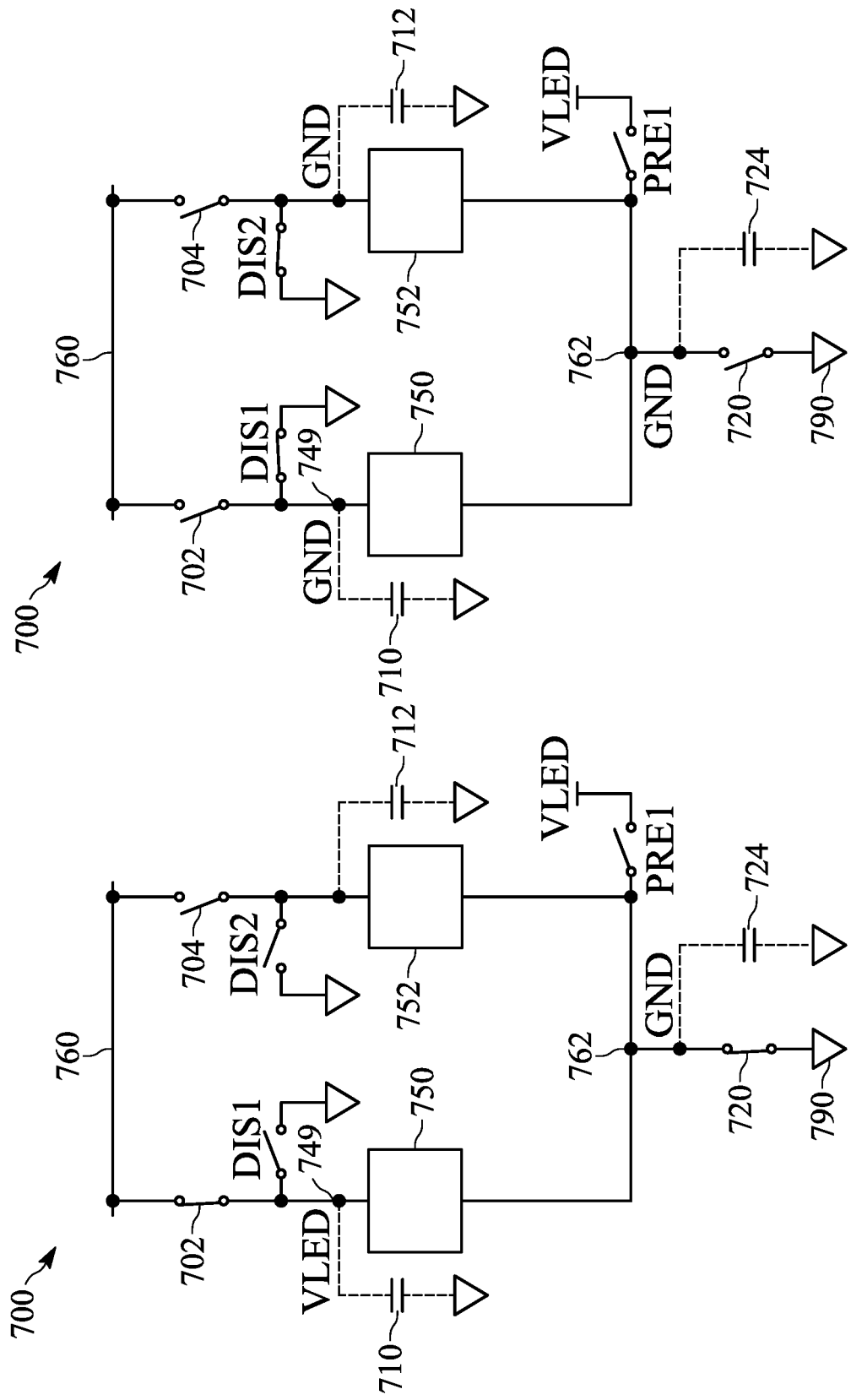

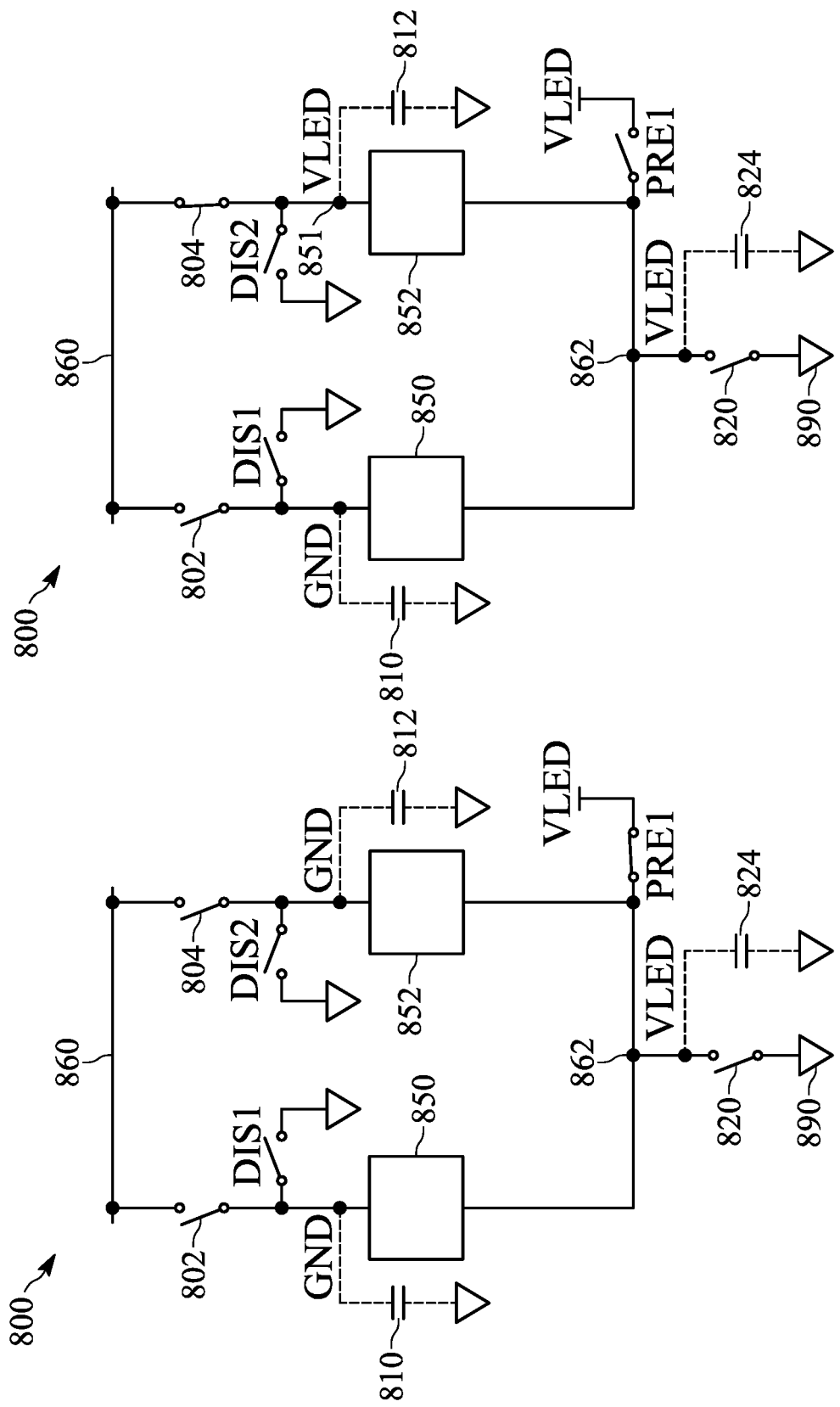

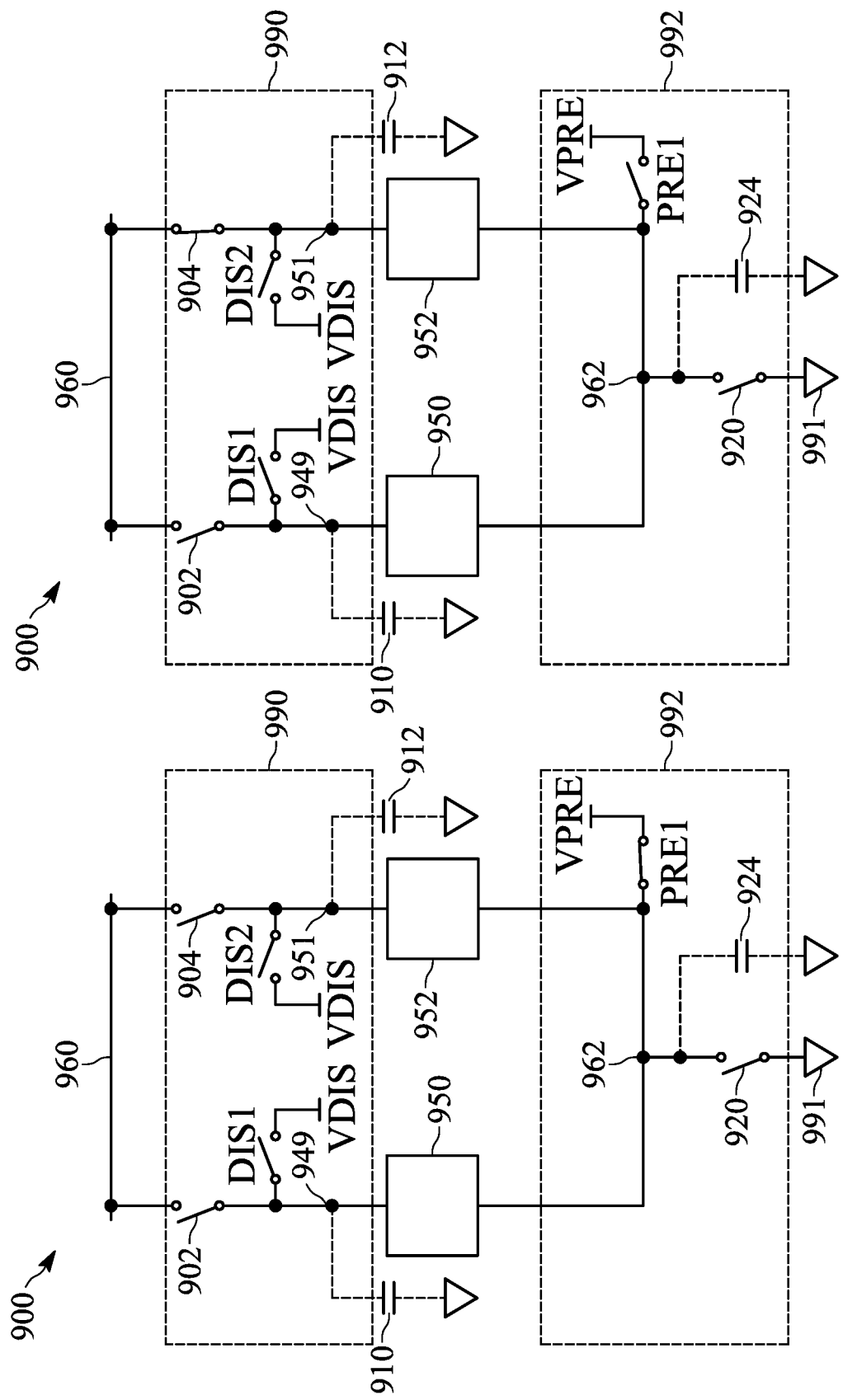

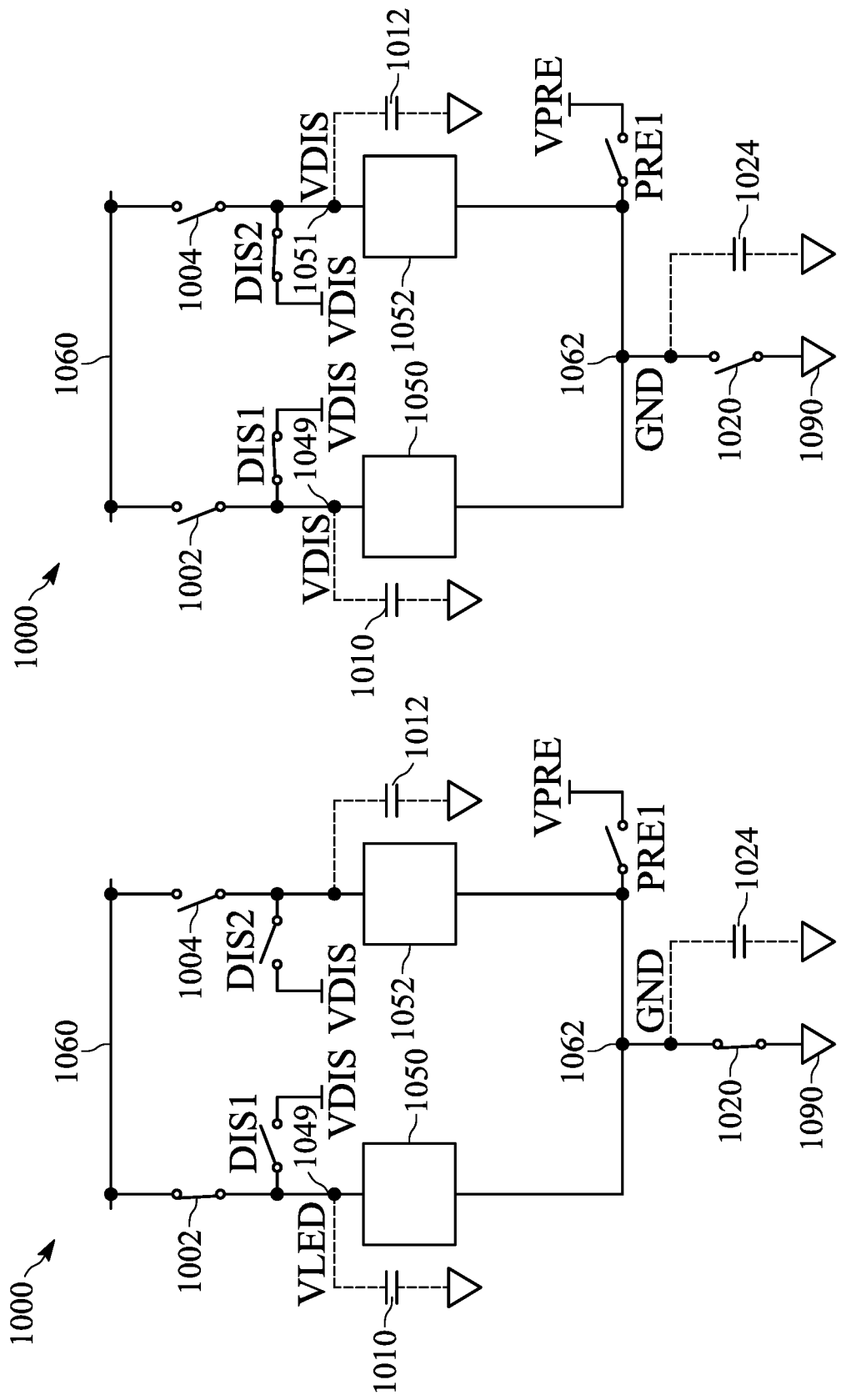

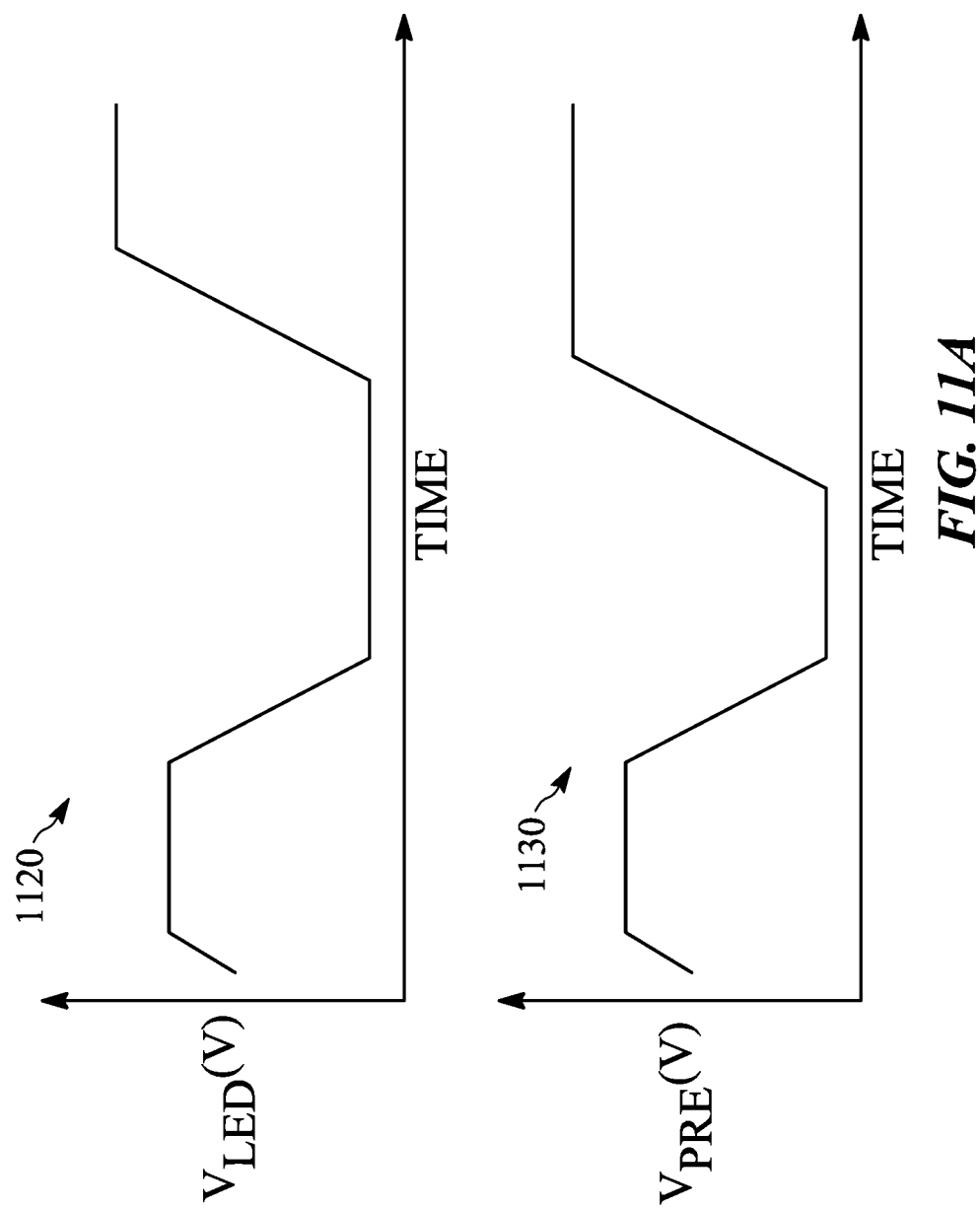

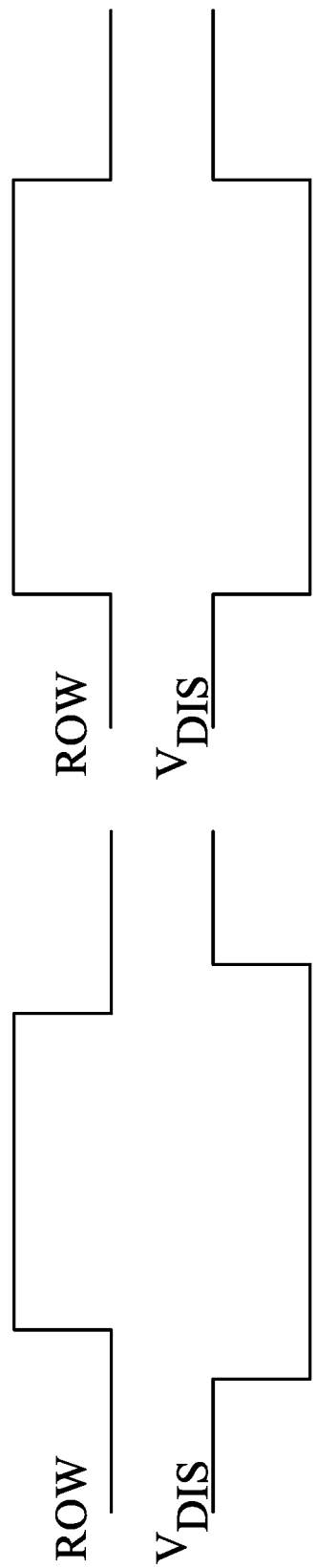

DISPLAY BACKLIGHTING SYSTEMS WITH CANCELLATION ARCHITECTURE FOR CANCELING GHOSTING PHENOMENA

RELATED APPLICATIONS

This application claims the benefit of priority of U.S. Provisional Application No. 62/875,911 filed Jul. 18, 2019 which is incorporated herein by reference.

TECHNICAL FIELD

The present description relates generally to electronic devices with displays, and more particularly, but not exclusively, to electronic devices with displays having backlights with local dimming.

BACKGROUND

Electronic devices such as computers, media players, cellular telephones, set-top boxes, and other electronic equipment are often provided with displays for displaying visual information. Displays such as organic light-emitting diode (OLED) displays and liquid crystal displays (LCDs) typically include an array of display pixels arranged in pixel rows and pixel columns. Liquid crystal displays commonly include a backlight unit and a liquid crystal display unit with individually controllable liquid crystal display pixels.

The backlight unit commonly includes one or more light-emitting diodes (LEDs) that generate light that exits the backlight toward the liquid crystal display unit. The liquid crystal display pixels are individually operable to control passage of light from the backlight unit through that pixel to display content such as text, images, video, or other content on the display.

A ghost effect or phenomena refers to the trailing of a moving object appearing on a display panel. Ghosting can happen even with static images for passive matrix drive. If there is a highlight in one row of LEDs, it can cause a ghosting to appear in the next row of LEDs. For LED displays, the ghosting phenomena may be caused by parasitic capacitance, which generates a ghost current spike and forces the time-multiplexed LEDs to emit a brief flash of light when the LEDs should have been turned off.

SUMMARY OF THE DESCRIPTION

In accordance with various aspects of the subject disclosure, an electronic device with a display is provided. The display includes a first array of light-emitting diodes (LEDs) of a backlight unit to generate backlight for the display with each LED including an anode and a cathode and a first switch to selectively couple a power supply voltage to a common anode of the first array of LEDs to control illumination of the first array of LEDs. A first discharge switch to selectively couple a first voltage level to a common anode of the first array of LEDs to discharge the common anode to prevent an undesired current path through the first array of LEDs and associated undesired illumination.

In accordance with other aspects of the subject disclosure, a display circuitry, comprises a first array of light emitting diodes (LEDs) having controllable brightness levels, a first switch to selectively couple a power supply voltage to a common anode of the first array of LEDs to control illumination of the first array of LEDs, and a first discharge switch to selectively couple a first discharge voltage level to the common anode of the first array of LEDs to discharge the common anode to prevent an undesired current path through the first array of LEDs that is caused by parasitic capacitance.

In accordance with other aspects of the subject disclosure, an electronic device comprises an array of light-emitting diodes (LEDs), a precharge switch to selectively couple a dynamically changing precharge voltage level to a common cathode of the array of LEDs to pre-charge the common cathode to prevent an undesired current path through the array of LEDs by barely turning the array of LEDs off or reverse-biasing the array of LEDs, and driver circuitry coupled to the array of LEDs. The driver circuitry is configured to generate drive signals to control the array of the light-emitting diodes. In another example, a pre-charge voltage level does not need to dynamically change. The pre-charge voltage level can be a fixed voltage as well.

BRIEF DESCRIPTION OF THE DRAWINGS

Certain features of the subject technology are set forth in the appended claims. However, for purpose of explanation, several embodiments of the subject technology are set forth in the following figures.

FIGS. 5A-5C illustrate display circuitry 500 having different display pixel zones or regions.

FIGS. 6A-6C illustrate display circuitry 600 having different display pixel zones or regions.

FIGS. 7A-7D illustrate a cancellation architecture to prevent an undesired current path from causing undesired illumination (ghosting effect) in display circuitry 700 having different display pixel zones or regions in accordance with one embodiment.

FIGS. 8A-8D illustrate a cancellation architecture to prevent an undesired current path from causing undesired illumination (ghosting effect) in display circuitry 800 having different display pixel zones or regions in accordance with one embodiment.

FIGS. 9A-9D illustrate a cancellation architecture to prevent an undesired current path from causing undesired illumination (ghosting effect) in display circuitry 900 having different display pixel zones or regions in accordance with one embodiment.

FIGS. 10A-10D illustrate a cancellation architecture to prevent an undesired current path from causing undesired illumination (ghosting effect) in display circuitry 1000 having different display pixel zones or regions in accordance with one embodiment.

FIG. 11A illustrates voltage timing diagrams for $V_{LED}$ and $V_{PRE}$ and FIG. 11B illustrates voltage timing diagrams for $V_{LED}$ and $V_{DIS}$.

FIGS. 11C-11D illustrate voltage timing diagrams for row driver signals and $V_{DIS}$.

DETAILED DESCRIPTION

Figure 1:
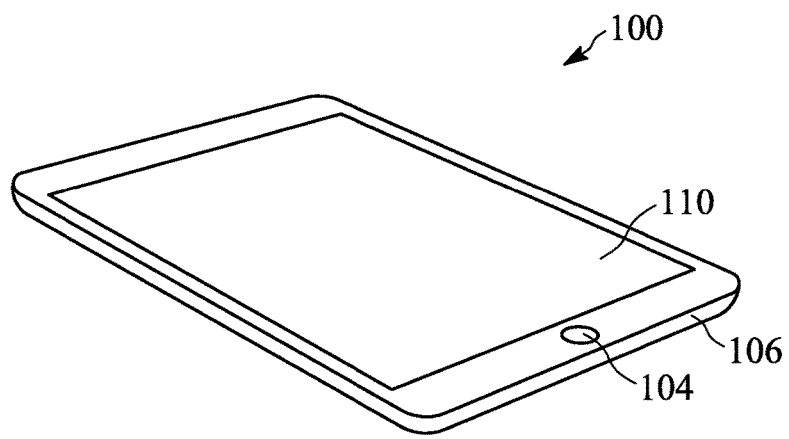
FIG. 1 illustrates a perspective view of an example electronic device having a display in accordance with various aspects of the subject technology.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

In one embodiment, at a high level, described are ghost cancellation architectures of a 2D backlight passive matrix display driver to perform ghost cancellation during transitions between different rows of LEDs in order to avoid unintended light coming out of LEDs that are intended to be OFF. Parasitic capacitances can cause the unintended light. These ghost cancellation architectures discharge anodes of LEDs with a discharge voltage level and precharge cathodes of LEDs with a precharge voltage level. Based on the level of ghosting artifacts, either or both of pre-charge and discharge can be enabled.

The subject disclosure provides electronic devices such as cellular telephones, media players, tablet computers, laptop computers, set-top boxes, smart watches, wireless access points, and other electronic equipment that include light-emitting diode arrays such as in backlight units of displays. Displays are used to present visual information and status data and/or may be used to gather user input data. A display includes an array of display pixels. Each display pixel may include one or more colored subpixels for displaying color images.

Each display pixel may include a layer of liquid crystals disposed between a pair of electrodes operable to control the orientation of the liquid crystals. Controlling the orientation of the liquid crystals controls the polarization of backlight. This polarization control, in combination with polarizers on opposing sides of the liquid crystal layer, allows light passing into the pixel to be manipulated to selectively block the light or allow the light to pass through the pixel.

The backlight unit includes one or more light-emitting diodes (LEDs) such as one or more strings and/or arrays of light-emitting diodes that generate the backlight for the display. In various configurations, strings of light-emitting diodes may be arranged along one or more edges of a light guide plate that distributes backlight generated by the strings to the LCD unit, or may be arranged to form a two-dimensional array of LEDs.

In a display, control circuitry coupled to the array of display pixels and to the backlight unit receives data for display from system control circuitry of the electronic device and, based on the data for display, generates and provides control signals for the array of display pixels and for the LEDs of the backlight unit.

In some scenarios, the backlight unit generates a constant amount of light for the display pixels and the amount of light that passes through each pixel is solely controlled by the operation of the liquid crystal display pixels. In other scenarios, the amount of light generated by the backlight is dynamically controlled, based on the content to be displayed on the display. In some devices with dynamic backlight control, individual backlight LEDs or groups of backlight LEDs are separately controlled to allow local dimming or brightening of the display to enhance the contrast generated by the LCD pixels. Control circuitry for the LEDs (e.g., for backlight LEDs) may include multiple matrix drivers, each for control of a subarray of an array of LEDs and each synchronized to a synchronization signal from a common controller. The control circuitry for the LEDs may include individual bypass switches for each LED to allow for local dimming at the level of individual LEDs.

Providing local dimming of the backlight LEDs in these disclosed configurations (e.g., using multiple driver circuits each dedicated to a subarray of LEDs and/or using individual LED dimming using bypass switches) allows the backlight circuitry to adjust brightness on a zone-by-zone basis within an image to be displayed. For example, backlight zones may be illuminated only in bright image areas and backlight zones may be dimmed or turned off in dark or black areas of an image. Local dimming in this way helps facilitate high dynamic range (HDR) display of images and improvements in color, contrast, motion-sharpness, and grey level.

Because display backlight units can include, in some implementations, a large number of LEDs (e.g., an array of tens, hundreds, thousands, or millions of LEDs), thermal management for LED backlights and/or other LED arrays can be challenging. The LED drive architectures disclosed herein, in which groups of LEDs and/or individual LEDs are independently controlled, can help reduce the thermal stress and/or energy loss by heat dissipation. Control systems and methods are also disclosed that reduce or minimize the headroom voltage for the backlight, which can also increase system efficiency.

An illustrative electronic device having a display is shown in FIG. 1. In the example of FIG. 1, device 100 has been implemented using a housing that is sufficiently small to be portable and carried by a user (e.g., device 100 of FIG. 1 may be a handheld electronic device such as a tablet computer or a cellular telephone). As shown in FIG. 1, device 100 includes a display such as display 110 mounted on the front of housing 106. Display 110 may include a display panel having active display pixels in an active area of the display and control circuitry for operating the active display pixels in an inactive portion. Display 110 may have openings (e.g., openings in the inactive or active portions of display 110) such as an opening to accommodate button 104 and/or other openings such as an opening to accommodate a speaker, a light source, or a camera.

Display 110 may be a touch screen that incorporates capacitive touch electrodes or other touch sensor components or may be a display that is not touch-sensitive. Display 110 includes display pixels formed from light-emitting diodes (LEDs), organic light-emitting diodes (OLEDs), plasma cells, electrophoretic display elements, electrowetting display elements, liquid crystal display (LCD) components, or other suitable display pixel structures. Arrangements in which display 110 is formed using liquid crystal display (LCD) components and a backlight such as two-dimensional array of LEDs that backlight LCD pixels are sometimes described herein as an example. This is, however, merely illustrative. In various implementations, any suitable type of display pixel technology may be used in forming display 110 if desired.

Housing 106, which may sometimes be referred to as a case, may be formed of plastic, glass, ceramics, fiber composites, metal (e.g., stainless steel, aluminum, etc.), other suitable materials, or a combination of any two or more of these materials.

The configuration of electronic device 100 of FIG. 1 is merely illustrative. In other implementations, electronic device 100 may be a computer such as a computer that is integrated into a display such as a computer monitor, a laptop computer, a somewhat smaller portable device such as a wrist-watch device, a pendant device, or other wearable or miniature device, a media player, a gaming device, a navigation device, a computer monitor, a television, or other electronic equipment.

For example, in some implementations, housing 106 may be formed using a unibody configuration in which some or all of housing 106 is machined or molded as a single structure or may be formed using multiple structures (e.g., an internal frame structure, one or more structures that form exterior housing surfaces, etc.). Although housing 106 of FIG. 1 is shown as a single structure, housing 106 may have multiple parts. For example, housing 106 may have upper portion and lower portion coupled to the upper portion using a hinge that allows the upper portion to rotate about a rotational axis relative to the lower portion. A keyboard such as a QWERTY keyboard and a touch pad may be mounted in the lower housing portion, in some implementations.

In some implementations, electronic device 100 is provided in the form of a computer integrated into a computer monitor. Display 110 may be mounted on a front surface of housing 106 and a stand may be provided to support housing (e.g., on a desktop).

Figure 2A:
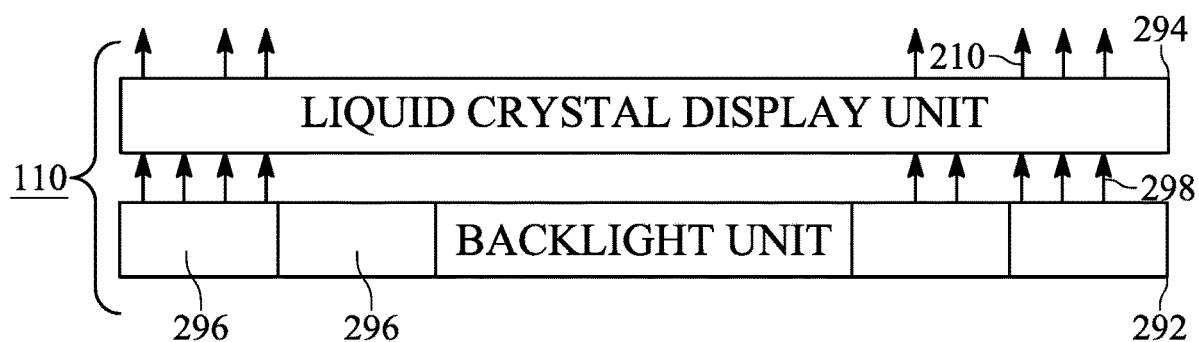
FIG. 2A illustrates a block diagram of a side view of an electronic device display having a backlight unit in accordance with various aspects of the subject technology.

FIG. 2A is a schematic diagram of display 110 in which the display is provided with a liquid crystal display unit 294 and a backlight unit 292. As shown in FIG. 2A, backlight unit 292 generates backlight 298 and emits backlight 298 in the direction of liquid crystal display unit 294. Liquid crystal display unit 294 selectively allows some or all of the backlight 298 to pass through the liquid crystal display pixels therein to generate display light 210 visible to a user. Backlight unit 292 includes one or more subsections 296.

In some implementations, subsections 296 may be elongated subsections that extend horizontally or vertically across some or all of display 110 (e.g., in an edge-lit configuration for backlight unit 292). In other implementations, subsections 296 may be square or other rectilinear subsections (e.g., subarrays of a two-dimensional LED array backlight). Accordingly, subsections 296 may be defined by one or more strings and/or arrays of LEDs disposed in that subsection. Subsections 296 may be controlled individually for local dimming of backlight 298.

Although backlight unit 292 is shown implemented with a liquid crystal display unit, it should be appreciated that a backlight unit such as backlight unit 292 may be implemented in a backlit keyboard, or to illuminate a flash device or otherwise provide illumination for an electronic device.

Figure 2B:
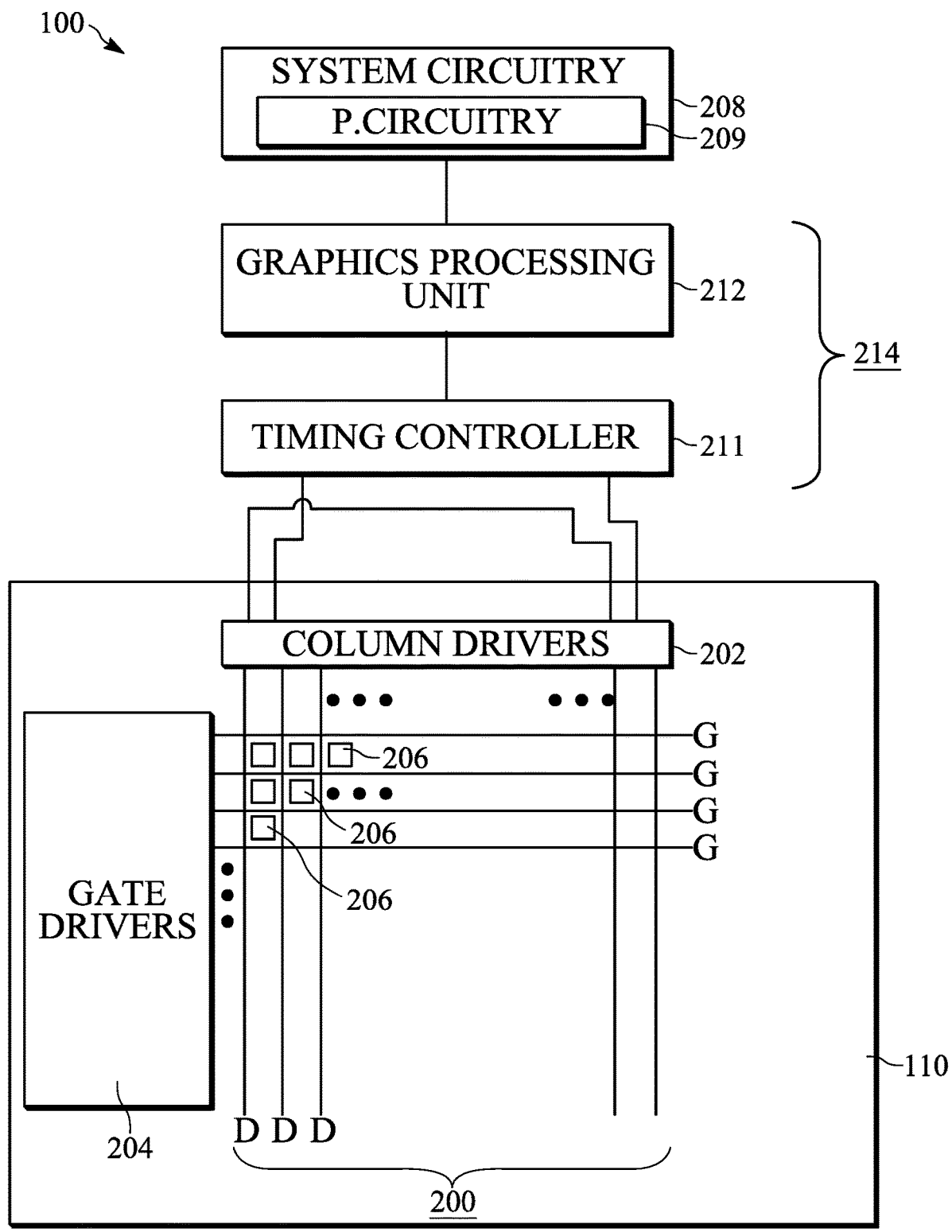
FIG. 2B is a schematic diagram of device 100 showing illustrative circuitry that may be used in displaying images for a user of device 100 on pixel array 200 of display 110.

FIG. 2B is a schematic diagram of device 100 showing illustrative circuitry that may be used in displaying images for a user of device 100 on pixel array 200 of display 110. As shown in FIG. 2B, display 110 may include column driver circuitry such as one or more column driver integrated circuits (CDICs) 202 that drive data signals (analog voltages) onto the data lines D of array 200. Display 110 may also include gate driver circuitry such as one or more gate drivers 204 (e.g., gate driver integrated circuits or GDICs) that drive gate line signals onto gate lines G of array 200.

Using the data lines D and gate lines G, display pixels 206 may be operated to display images on display 110 for a user. In some implementations, CDIC(s) 202 may be mounted on the display substrate with display pixels 206 or attached to the display substrate by a flexible printed circuit or other connecting layer. In some implementations, gate driver circuitry 204 may be implemented using thin-film transistor circuitry on a display substrate such as a glass or plastic display substrate or may be implemented using integrated circuits that are mounted on the display substrate or attached to the display substrate by a flexible printed circuit or other connecting layer. For example, gate driver circuitry 204 may include a plurality of gate driver integrated circuits directly formed on the display panel substrate (e.g., each configured to provide one or more gate signals along one or more corresponding ones of signal gate lines G for one or more corresponding rows of display pixels 206).

Device 100 may include system circuitry 208. System circuitry 208 may include one or more different types of storage such as hard disk drive storage, nonvolatile memory (e.g., flash memory or other electrically-programmable-read-only memory), volatile memory (e.g., static or dynamic random-access-memory), magnetic or optical storage, permanent or removable storage and/or other non-transitory storage media configure to store static data, dynamic data, and/or computer readable instructions for processing circuitry in system circuitry 208. Processing circuitry in system circuitry 208 may be used in controlling the operation of device 100. Processing circuitry 209 in system circuitry 208 may sometimes be referred to herein as system circuitry or a system-on-chip (SOC) for device 100.

The processing circuitry 209 may be based on a processor such as a microprocessor and other suitable integrated circuits, multi-core processors, one or more application specific integrated circuits (ASICs) or field programmable gate arrays (FPGAs) that execute sequences of instructions or code, as examples. In one suitable arrangement, system circuitry 208 may be used to run software for device 100, such as internet browsing applications, email applications, media playback applications, operating system functions, software for capturing and processing images, augmented reality (AR) applications, virtual reality (VR) applications, three-dimensional (3D) video applications, etc.

During operation of device 100, system circuitry 208 may generate or receive data that is to be displayed on display 110. This display data may be processed, scaled, modified, and/or provided with processing circuitry 209 to display control circuitry such as graphics processing unit (GPU) 212. For example, display frames, including display pixel values (e.g., each corresponding to a grey level) for display using pixels 206 (e.g., colored subpixels such as red, green, and blue subpixels) may be provided from system circuitry 208 to GPU 212. GPU 212 may process the display frames and provide processed display frames to timing controller integrated circuit 211.

Timing controller 211 provides digital display data (e.g., the digital pixel values each corresponding to a grey level for display) to CDIC(s) 202. Using digital-to-analog converter circuitry, bias circuitry, internal gamma voltage circuitry, level shifter circuitry, shift register circuitry, and/or the like within column driver circuitry 202, column driver circuitry 202 provides corresponding analog output signals on the data lines D running along the columns of display pixels 206 of array 200. Gate drivers 204 such as one or more gate driver integrated circuits (GDICs) on the display panel may receive timing and/or other control signals from timing controller 211.

Graphics processing unit 212 and timing controller 211 may sometimes collectively be referred to herein as display control circuitry 214. Display control circuitry 214 may be used in controlling the operation of display 110. Display control circuitry 214 may sometimes be referred to herein as a display driver, a display controller, a display driver integrated circuit (IC), or a driver IC. Graphics processing unit 212 and timing controller 211 may be formed in a common package (e.g., an SOC package) or may be implemented separately (e.g., as separate integrated circuits). In some implementations, timing controller 211 may be implemented separately as a display driver, a display controller, a display driver integrated circuit (IC), or a driver IC that receives processed display data from graphics processing unit 212. Accordingly, in some implementations, graphics processing unit 212 may be considered to be part of the system circuitry (e.g., together with system circuitry 208) that provides display data to the display control circuitry (e.g., implemented as timing controller 211, gate drivers 204, and/or CDIC(s) 202). Although a single gate line G and a single data line D for each pixel 206 are illustrated in FIG. 2B, this is merely illustrative and one or more additional row-wise and/or column-wise control lines may be coupled to each pixel 206 in various implementations.

Figure 3:
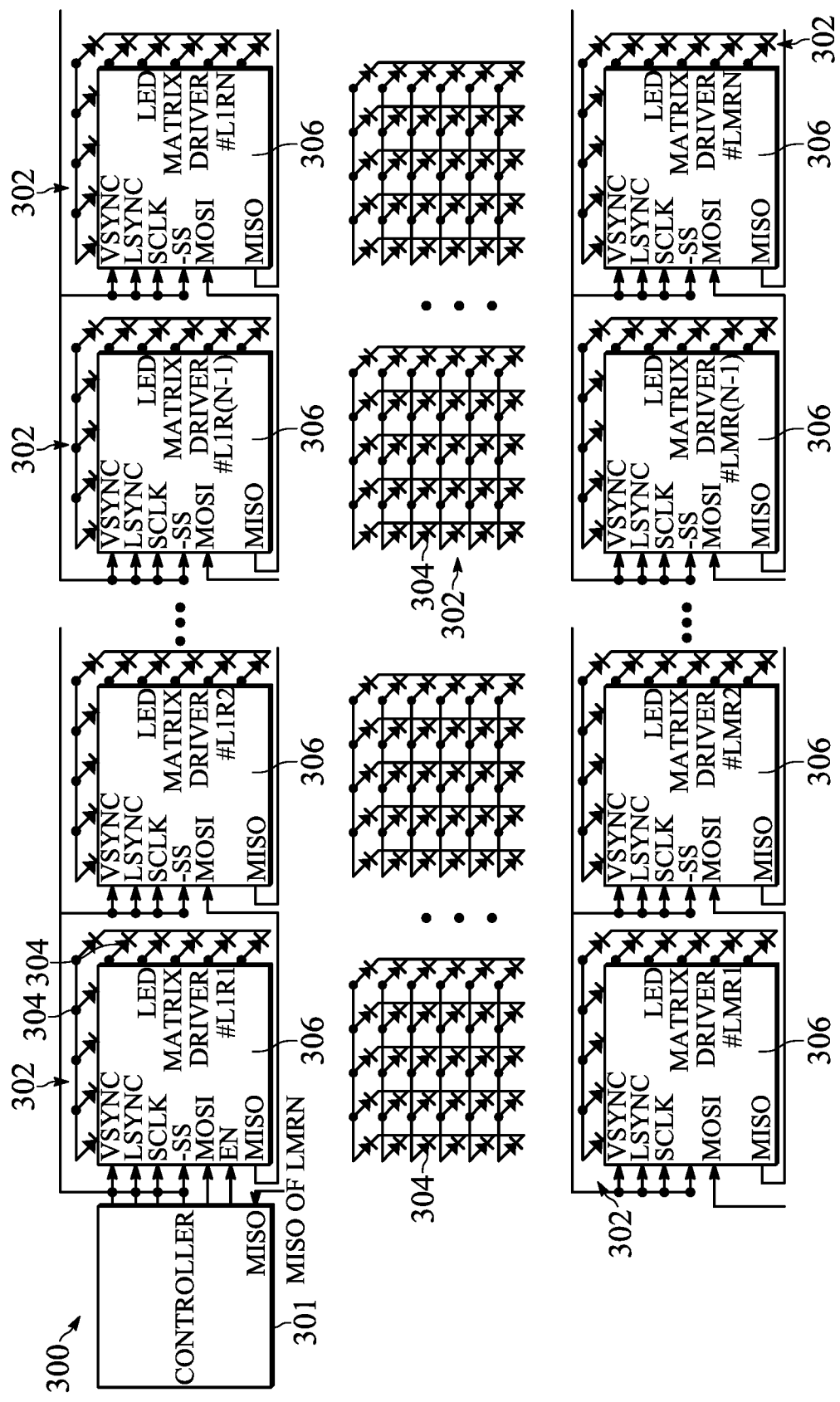
FIG. 3 shows a schematic diagram of exemplary display circuitry including control circuitry 300 that may be implemented in backlight unit or other LED lighting devices.

FIG. 3 shows a schematic diagram of exemplary display circuitry including control circuitry 300 that may be implemented in backlight unit or other LED lighting devices. In the example of FIG. 3, control circuitry 300 includes multiple subarrays 302 of LEDs 304 that, in combination, form a two-dimensional array of LEDs. Each subarray 302 may include one or more strings of LEDs that each include multiple LEDs 304 in series. Subarrays 302 may each include multiple strings of LEDs that are coupled, in parallel, between a common supply voltage source and a current controller for that string.

Each subarray 302 includes a dedicated matrix driver circuit 306 (sometimes referred to simply as driver circuits for convenience) that operates the LEDs 304 in that array. Each matrix driver circuit 306 operates the LEDs 304 of its associated array 302 to provide local dimming of the entire array or local dimming of individual strings of LEDs in that array. Each matrix driver circuit 306 provides local dimming of LEDs 304, which may enhance the relative brightness and darkness of display content controlled by LCD unit 294. Accordingly, matrix driver circuitry 306 may operate the LEDs of their associated arrays 304 based, at least in part, on the content being displayed using LCD unit 294.

In order to operate the LEDs of an associated array 304 based, at least in part, on the content being displayed using LCD unit 294, each matrix driver circuitry 306 receives one or more control signals from a common controller 301. As shown in the example of FIG. 3, each matrix driver 306 receives the same vertical synchronization (VSYNC), line synchronization (LSYNC), serial clock (SCLK) and slave select (-SS) signal from controller 301. The VSYNC, LSYNC, SCLK and/or -SS signals may be signals used to operate the LCD pixels of LCD unit 294 as would be understood by one skilled in the art. For example, the VSYNC signal may be provided by controller 301 to indicate each display refresh or each display frame to be displayed using LCD pixels of the LCD unit. The LSYNC signal may be provided by controller 301 to signal the start of operation of each pixel row.

Controller 301 may be used to provide control signals such as the VSYNC and LSYNC signals, and/or other control signals, to both backlight unit 292 and LCD unit 294 or controller 301 may be a dedicated backlight control unit that receives the VSYNC, LSYNC, and/or other control signals from another display controller associated with LCD unit 294.

Each matrix driver 306 may update the brightness of its associated array 302 (e.g., the entire array or a subset of the array) based on the commonly received VSYNC signal (e.g., the brightness may be updated upon receipt of the rising edge of the VSYNC signal). In some implementations, each matrix driver 306 may include a programmable delay to set the relative timings of the various LED array updates based on the rising edge of the common VSYNC signal.

A first one of matrix drivers 306 (labeled LED Matrix Driver #L1R1 in FIG. 3) also receives and an enable signal (EN) and a Master-Out-Slave-In signal (MOSI) from common controller 301. LED Matrix Driver #L1R1 provides a Master-In-Slave-Out signal (MISO) to a next one of matrix drivers 306 (labeled LED Matrix Driver #L1R2 in FIG. 3), and so forth until a last one of matrix drivers 306 (labeled LED Matrix Driver #LMRN in FIG. 3). LED Matrix Driver #LMRN provides a MISO signal back to controller 301.

In some implementations, each matrix driver 306 may be an integrated circuit having an internal clock. However, due to process variations in manufacturing integrated circuits, an array of matrix drivers 306 each having its own clock can be problematic in that the operation of the various LED arrays 302 can be out of sync by as much as, for example, 10 percent. In order to ensure that the local dimming of LEDs 304 of various arrays 302 are synchronized to the associated content to be displayed, matrix drivers 306 are operated using a common (e.g., master) clock signal SCLK with synchronization of the various matrix drivers using the common LSYNC signal.

Figure 4:
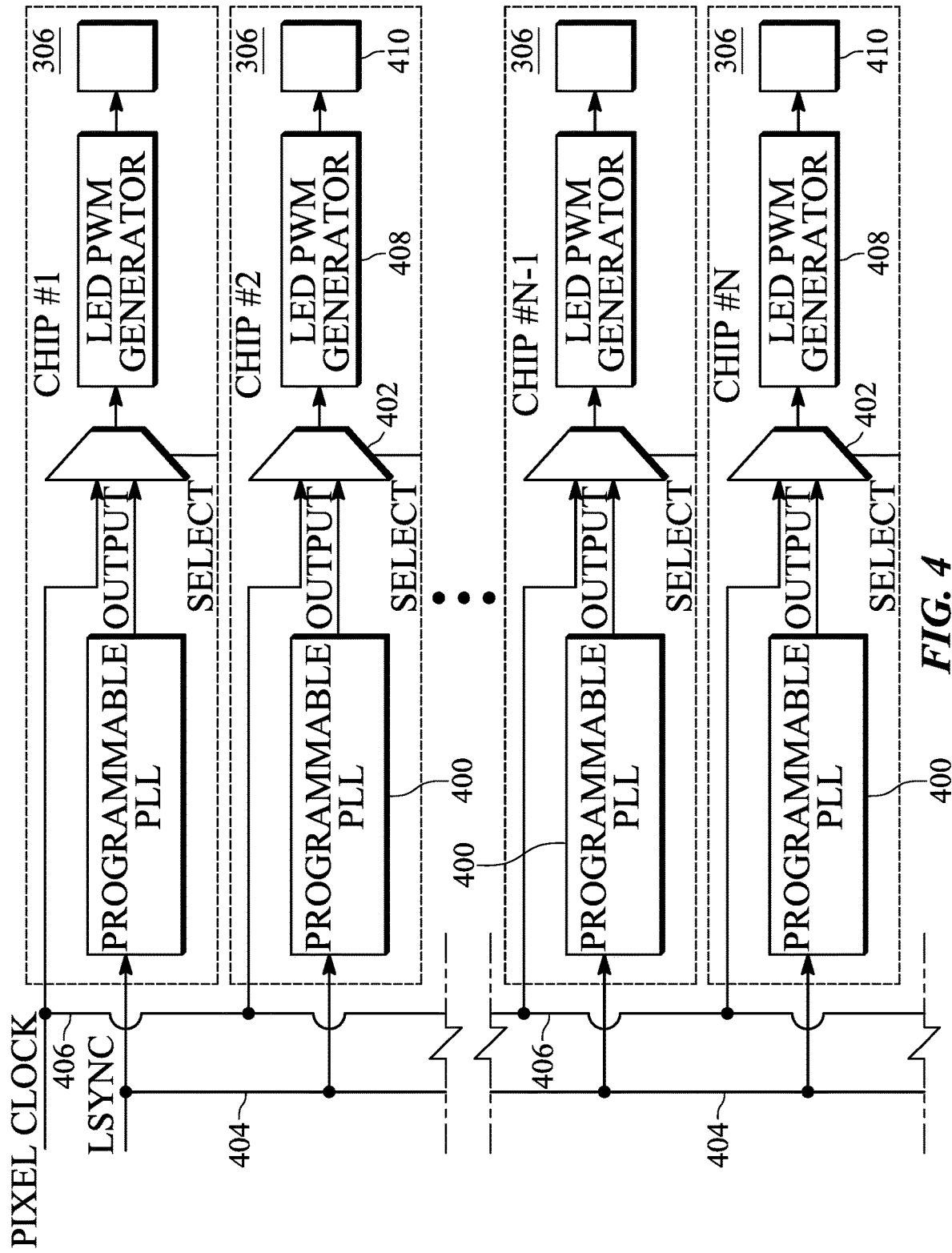
FIG. 4 shows a schematic representation of exemplary circuitry of matrix drivers 306.

FIG. 4 shows a schematic representation of exemplary circuitry of matrix drivers 306. In the example of FIG. 4, each matrix driver 306 includes a programmable phase lock loop (PLL) 400. Each PLL 400 receives the common LSYNC signal along a path 404 from common controller 301 of FIG. 3 and generates a synchronization output signal which is provided to a multiplexer 402. Each multiplexer 402 also receives the clock signal (labeled Pixel Clock in FIG. 4 and SCLK in FIG. 3) along a path 406 from common controller 301.

Based on a selection signal "Select", each multiplexer 402 generates a driver clock signal for its associated matrix driver 306, the driver clock signal geared from the LSYNC synchronized PLL signal and/or the clock signal. The selected driver clock signal is provided to a pulse-width modulation (PWM) generator 408 that generates a PWM signal, based on the provided driver clock signal, for use in controlling the brightness of the LEDs (e.g., in one or more strings) in the array 302 associated with that matrix driver 306.

The PWM signal from the PWM generator 408 of each matrix driver 306 is provided to LED control circuitry 410 of that matrix driver 306 for controlling the brightness of LEDs 304 of that array 302 associated with that matrix driver 306. LED control circuitry 410 of each matrix driver 306 may include, for example, a DC/DC converter or switching converter (e.g., implemented as a buck converter, a boost converter, or an inverter) for providing a supply voltage to a first end of each LED string in the associated array 302. The supply voltage generated by LED control circuitry 410 is based on the PWM signal provided by the associated LED PWM generator 408.

LED control circuitry 410 of each matrix driver 306 may also include additional circuitry such as a current driver circuitry or controlling current at a second end of each string of LEDs, may include headroom voltage control circuitry, and/or may include individual LED switching circuitry (e.g., in implementations in which each LED in a string is provided with a bypass switch as described in further detail hereinafter).

Each matrix driver 306 may also include headroom voltage control circuitry that provides feedback control of LED arrays 302 to help reduce energy loss by reducing or minimizing residual voltages at the end of each LED string.

Figure 5C:
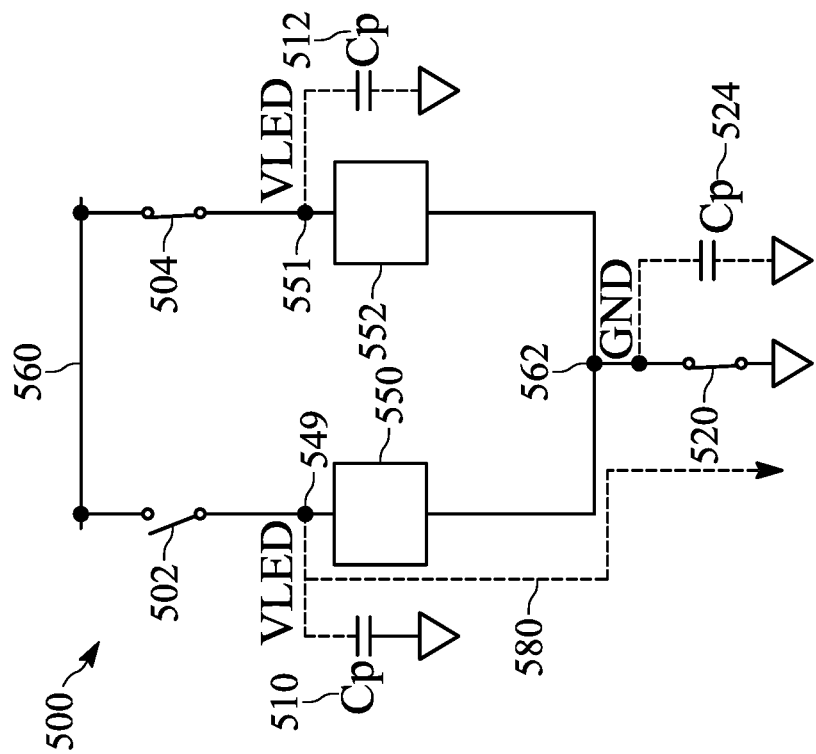

FIGS. 5A-5C illustrate display circuitry 500 having different display pixel zones or regions. FIG. 5C illustrates an undesired current path 580 that cause undesired illumination (ghosting effect) in the display circuitry 500. The display circuitry 500 includes switches 502, 504, and 520, display pixel regions 550 and 552 (e.g., light-emitting diodes (LEDs), organic light-emitting diodes (OLEDs), plasma cells, electrophoretic display elements, electrowetting display elements, liquid crystal display (LCD) components, or other suitable display pixel structures), parasitic capacitances 510, 512, 524, power supply 560, and common cathode 562.

For a first circuit configuration of FIG. 5A, switches 502 and 520 are closed while switch 504 is open. This results in a supply voltage (e.g., $V_{LED}$) forming at common anode 549 of the display pixel region 550 and common cathode 562 having a ground level voltage. For a second circuit configuration of FIG. 5B, the switches 502, 504, and 520 are open. This results in the supply voltage (e.g., $V_{LED}$) being maintained at common anode 549 of the display pixel region 550 and common cathode 562 remains at the ground level voltage. For a third circuit configuration of FIG. 5C, the switch 502 is open while switches 504 and 520 are closed. This results in the supply voltage (e.g., $V_{LED}$) being maintained at common anode 549 of the display pixel region 550, the supply voltage (e.g., $V_{LED}$) forms at common anode 551 of the display pixel region 552, and the common cathode 562 remains at the ground level voltage. An undesired current path 580 (ghosting path) causes display pixel region 550 to be illuminated due to voltage difference between anode 549 of LEDs and cathode 562 of LEDs being greater than forward voltage of the LEDs although switch 502 is open (no current path).

Figure 6A:
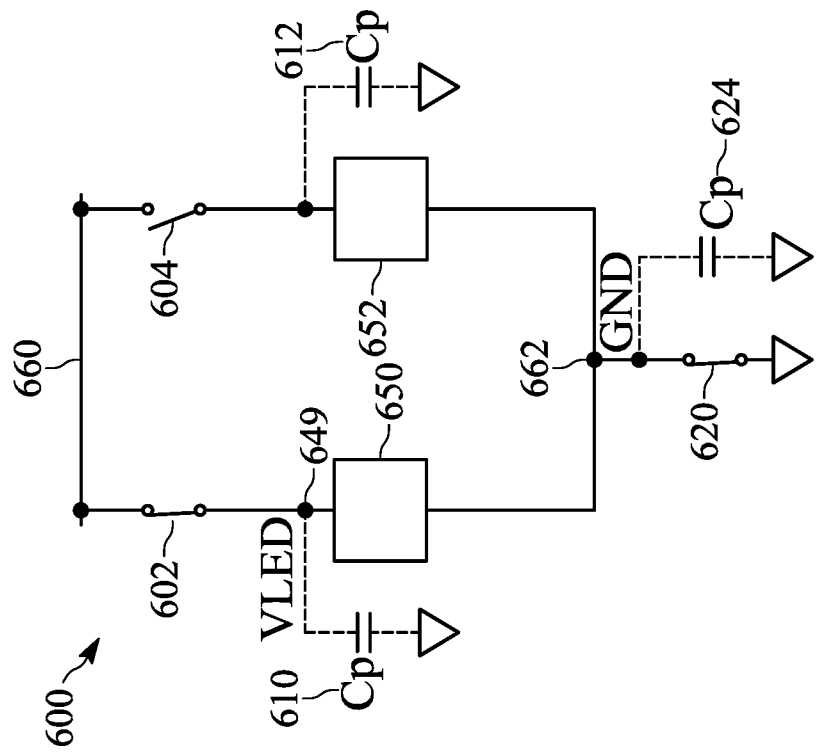

FIGS. 6A-6C illustrate display circuitry 600 having different display pixel zones or regions. FIG. 6C illustrates an undesired current path 680 that can cause undesired illumination (ghosting effect) in the display circuitry 600. The display circuitry 600 includes switches 602, 604, and 620, display pixel regions 650 and 652 (e.g., light-emitting diodes (LEDs), organic light-emitting diodes (OLEDs), plasma cells, electrophoretic display elements, electrowetting display elements, liquid crystal display (LCD) components, or other suitable display pixel structures), parasitic capacitances 610, 612, 624, power supply 660, and common cathode 662.

For a first circuit configuration of FIG. 6A, switches 602 and 620 are closed while switch 604 is open. This results in a supply voltage (e.g., $V_{LED}$) forming at common anode 649 of the display pixel region 650 and common cathode 662 having a ground level voltage. For a second circuit configuration of FIG. 6B, the switches 602, 604, and 620 are open. This results in the supply voltage (e.g., $V_{LED}$) being maintained at common anode 649 of the display pixel region 650 and common cathode 662 remains at the ground level voltage. For a third circuit configuration of FIG. 6C, the switches 602 and 620 are open while switch 604 is closed. This results in the supply voltage (e.g., $V_{LED}$) being maintained at common anode 649 of the display pixel region 650, the supply voltage (e.g., $V_{LED}$) forms at anode 651 of the display pixel region 652, and common cathode 662 remains at the ground level voltage. An undesired current path 680 causes display pixel region 652 to be illuminated (ghosting effect) due to voltage difference between anode 604 of LEDs and cathode 662 of LEDs being greater than forward voltage of the LEDs although switch 620 is open (no current path).

FIGS. 7A-7D illustrate a cancellation architecture to prevent an undesired current path from causing undesired illumination (ghosting effect) in display circuitry 700 having different display pixel zones or regions in accordance with one embodiment. The display circuitry 700 includes switches 702, 704, 720, DIS1, DIS2, PRE1, display pixel regions 750 and 752 (e.g., light-emitting diodes (LEDs), organic light-emitting diodes (OLEDs), plasma cells, electrophoretic display elements, electrowetting display elements, liquid crystal display (LCD) components, or other suitable display pixel structures), parasitic capacitances 710, 712, 724, power supply 760, ground reference point 790 (or ground plane), and common cathode 762.

Figures 7C, 7D:
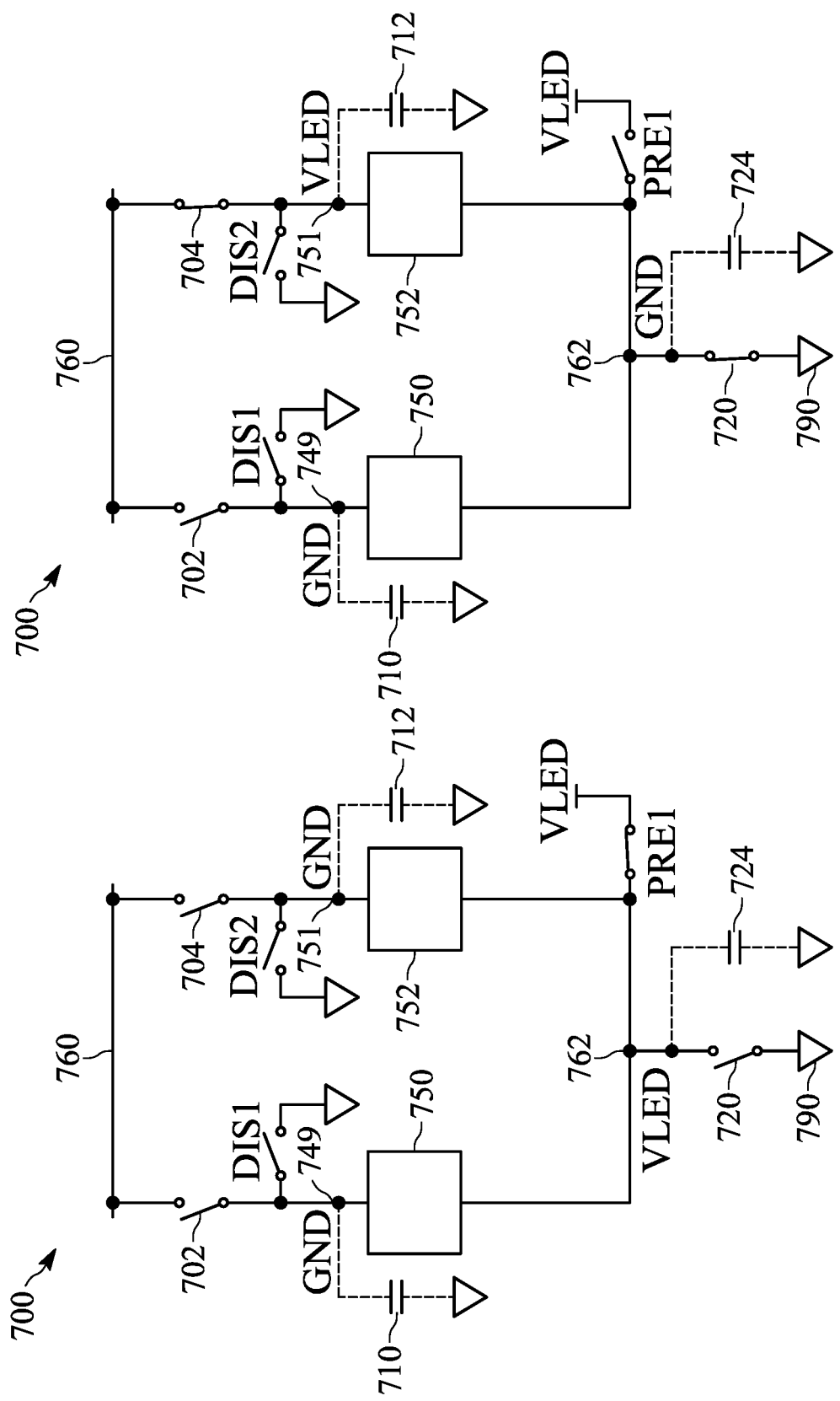

For a first circuit configuration of FIG. 7A, switches 702 and 720 are closed while switches 704, DIS1, DIS2, and PRE1 are open. This results in a supply voltage (e.g., $V_{LED}$) of power supply 760 forming at common anode 749 of the display pixel region 750. For a second circuit configuration of FIG. 7B, the switches 702, 704, and 720 are open while discharge switches DIS1 and DIS2 are closed. This results in the supply voltage (e.g., $V_{LED}$) at common anode 749 being discharged via switch DIS1 and the common anode 749 having a ground level voltage. For a third circuit configuration of FIG. 7C, the switches 702, 704, 720, DIS1, DIS2 are open. A switch precharge PRE1 switch is closed to precharge common cathode 762 to a power supply voltage (e.g., $V_{LED}$). A ground level voltage forms at separate anodes 749 and 751. Anode 749 is common for the LEDs of the display region 750 and anode 751 is common for the LEDs of the display region 752.

For a fourth circuit configuration of FIG. 7D, the switches 702, DIS1, DIS2, and PRE1 are open while switches 704 and 720 are closed. This results in the supply voltage (e.g., $V_{LED}$) being formed at anode 751 of the display pixel region 552, ground voltage level at common cathode 762, and intended illumination of display pixel region 752. An undesired current path 580 and ghosting effect are prevented due to the discharge of common anode 749 with switch DIS1 before turning switches 704 and 720 ON (closing switches 704 and 720).

FIGS. 8A-8D illustrate a cancellation architecture to prevent an undesired current path from causing undesired illumination (ghosting effect) in display circuitry 800 having different display pixel zones or regions in accordance with one embodiment. The display circuitry 800 includes switches 802, 804, 820, DIS1, DIS2, PRE1, display pixel regions 850 and 852 (e.g., light-emitting diodes (LEDs), organic light-emitting diodes (OLEDs), plasma cells, electrophoretic display elements, electrowetting display elements, liquid crystal display (LCD) components, or other suitable display pixel structures), parasitic capacitances 810, 812, 824, power supply 860, ground reference point 890 (or ground plane), and common cathode 862.

Figures 8A, 8B:
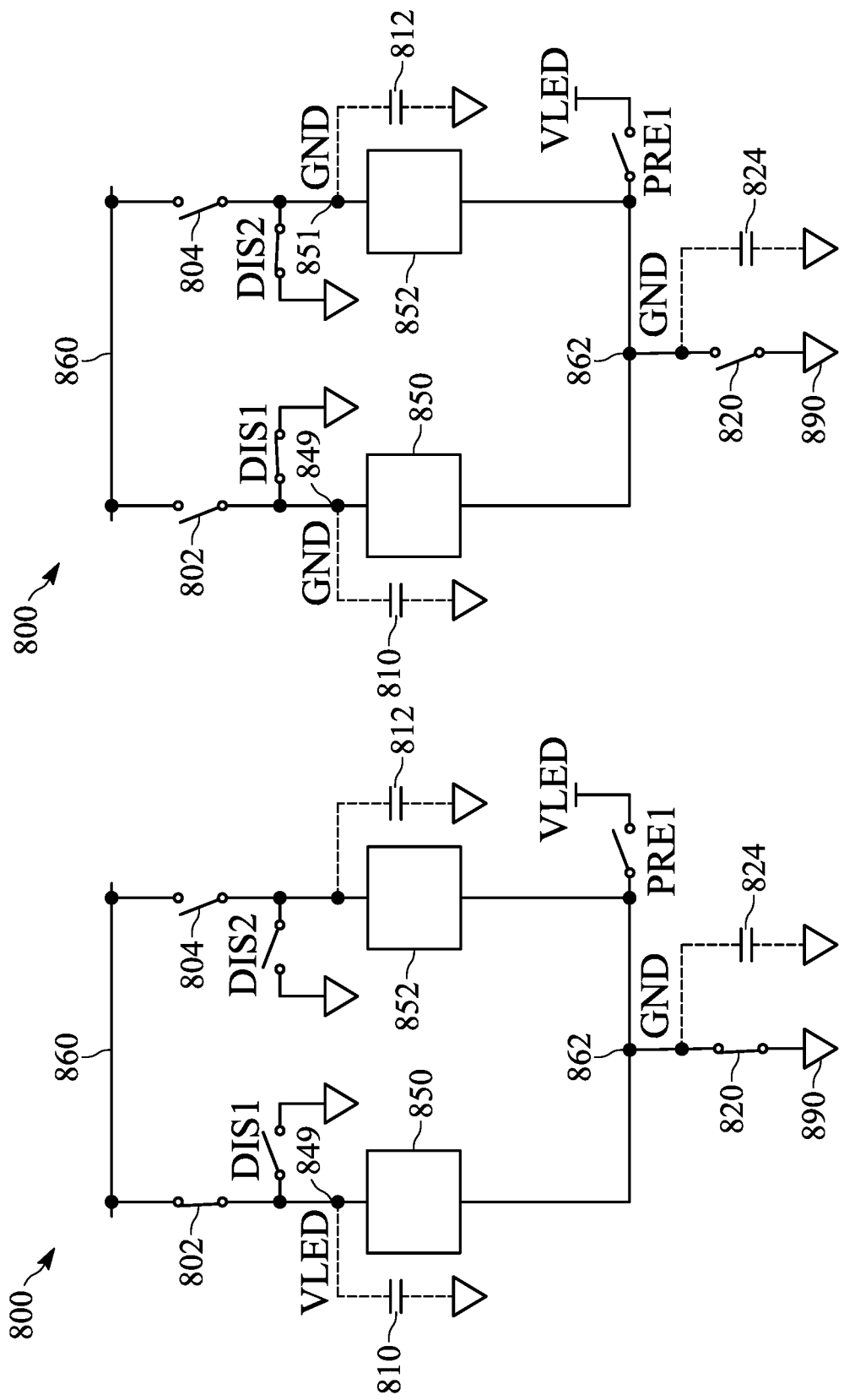

For a first circuit configuration of FIG. 8A, switches 802 and 820 are closed while switches 804, DIS1, DIS2, and PRE1 are open. This results in a supply voltage (e.g., $V_{LED}$) forming at common anode 849 of the display pixel region 850. For a second circuit configuration of FIG. 8B, the switches 802, 804, 820, and PRE1 are open while discharge switches DIS1 and DIS2 are closed. This results in the supply voltage (e.g., $V_{LED}$) at common anode 849 being discharged via switch DIS1 and the anodes 849 and 851 having a ground level voltage after the switches DIS1 and DIS2 are turned ON. For a third circuit configuration of FIG. 8C, the switches 802, 804, 820, DIS1, DIS2 are open. A precharge PRE1 switch is closed to precharge common cathode 862 to a power supply voltage.

For a fourth circuit configuration of FIG. 8D, the switches 802, 820, DIS1, DIS2, and PRE1 are open while switch 804 is closed. This results in the supply voltage (e.g., $V_{LED}$) being formed at anode 851 of the display pixel region 852. Common cathode 862 has power supply voltage due to switch PRE1 being turned ON earlier as illustrated in FIG. 8C. An undesired current path 680 is prevented due to the precharge of common cathode 862 with switch PRE1 before turning switch 804 ON. As opposed to FIG. 7D, switch 820 is not turned ON for this fourth circuit configuration because display pixel region 852 (e.g., LED zone 852) is desired to be a black zone.

FIGS. 9A-9D illustrate a cancellation architecture to prevent an undesired current path from causing undesired illumination (ghosting effect) in display circuitry 900 having different display pixel zones or regions in accordance with one embodiment. The display circuitry 900 includes switches 902, 904, 920, DIS1, DIS2, PRE1, display pixel regions 950 and 952 (e.g., light-emitting diodes (LEDs), organic light-emitting diodes (OLEDs), plasma cells, electrophoretic display elements, electrowetting display elements, liquid crystal display (LCD) components, or other suitable display pixel structures), parasitic capacitances 910, 912, 924, power supply 960, ground reference point 991 (or ground plane), and common cathode 962. Row driver signals are applied to 990 and column driver signals are applied to region 992.

Figures 9A, 9B:
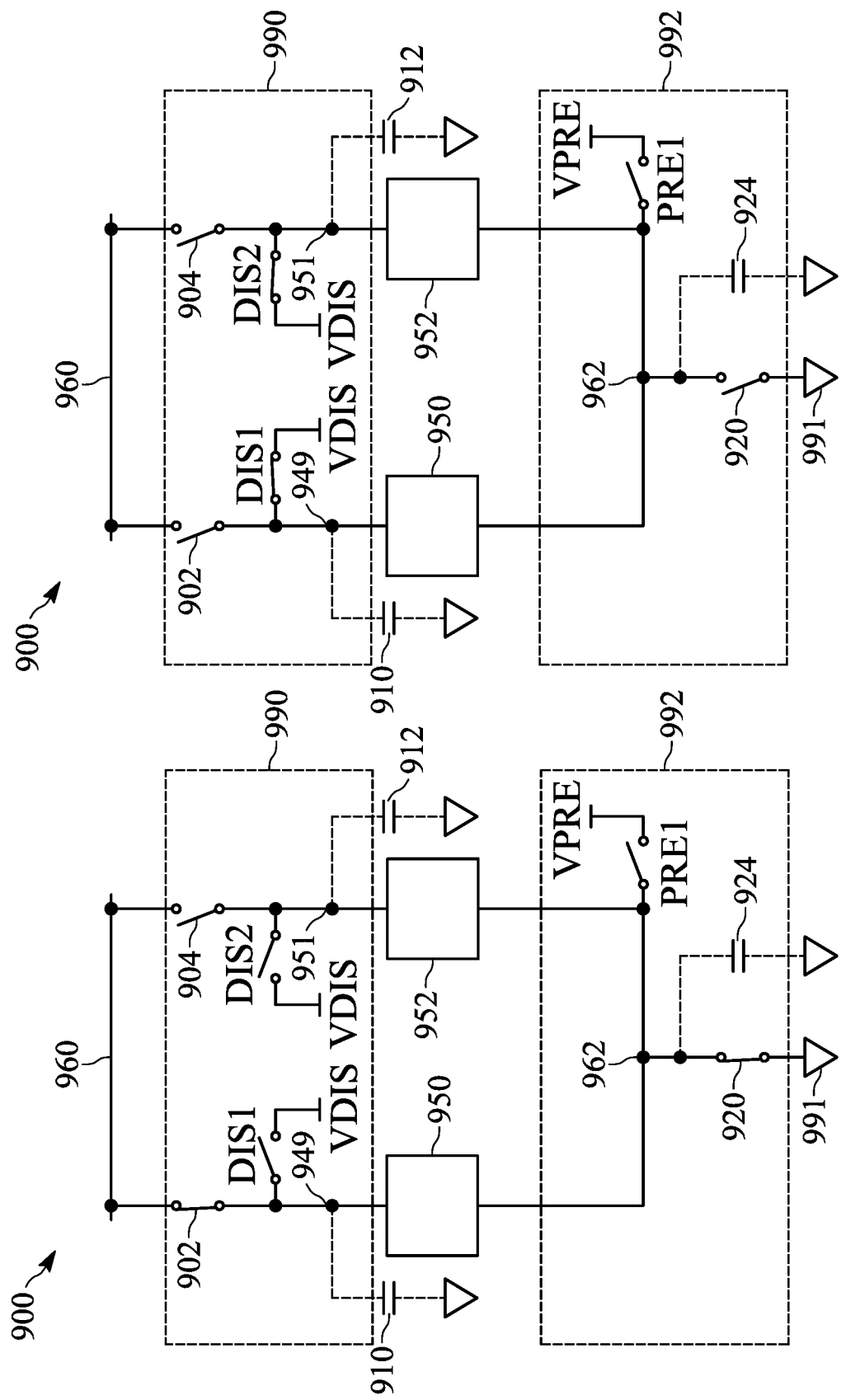

For a first circuit configuration of FIG. 9A, switches 902 and 920 are closed while switches 904, DIS1, DIS2, and PRE1 are open. This results in a supply voltage (e.g., $V_{LED}$) forming at common anode 949 of the display pixel region 950. For a second circuit configuration of FIG. 9B, the switches 902, 904, 920, and PRE1 are open while discharge switches DIS1 and DIS2 are closed. This results in the supply voltage (e.g., $V_{LED}$) at common anode 949 of display pixel region 950 being discharged via switch DIS1. Both anodes 949 and 951 will be at a ground voltage level after the switches DIS1 and DIS2 are turned on. For a third circuit configuration of FIG. 9C, the switches 902, 904, 920, DIS1, DIS2 are open. A precharge PRE1 switch is closed to precharge common cathode 962 to a precharge voltage $V_{PRE}$.

For a fourth circuit configuration of FIG. 9D, the switches 902, 920, DIS1, DIS2, and PRE1 are open while switch 904 is closed. This results in the supply voltage (e.g., $V_{LED}$) being formed at anode 951 of the display pixel region 952. Common cathode 962 has $V_{PRE}$ voltage due to switch PRE1 being turned ON earlier as illustrated in FIG. 9C. An undesired current path 680 is prevented due to the precharge of common cathode 962 with switch PRE1 before turning switch 904 ON. As opposed to FIG. 7D, switch 920 is not turned ON for the fourth circuit configuration because the display pixel region 952 (e.g., LED zone 952) is desired to be a black zone. It is noted for FIGS. 7A-7D, 8A-8D, and 9A-9D switching times for switches DIS1, DIS2 and PRE1 can change based on the design requirements of a display system. The constraint is that switches DIS1/DIS2 should not be ON at the same time as anode switches (e.g., 702, 704, 802, 804, 902, 904) while PRE1 should not be ON at the same as cathode switch (e.g., 720, 820, 920). Simultaneous switching between corresponding pairs is acceptable though. For this present application, it is also noted that a ground connection through a switch at the common cathode of the LEDs is a conceptual model of an LED current driver for illustrating ghosting artifacts and proposed cancellation architecture.

FIGS. 10A-10D illustrate a cancellation architecture to prevent an undesired current path from causing undesired illumination (ghosting effect) in display circuitry 1000 having different display pixel zones or regions in accordance with one embodiment. The display circuitry 1000 is similar to display circuitry 700, except that the switch PRE1 is connected to VPRE and switches DIS1/DIS2 are connected to $V_{DIS}$ to avoid an undesired current path 580 and reduce power consumption. The display circuitry 1000 includes switches 1002, 1004, 1020, DIS1, DIS2, PRE1, display pixel regions 1050 and 1052 (e.g., light-emitting diodes (LEDs), organic light-emitting diodes (OLEDs), plasma cells, electrophoretic display elements, electrowetting display elements, liquid crystal display (LCD) components, or other suitable display pixel structures), parasitic capacitances 1010, 1012, 1024, power supply 1060, ground reference point 1090 (or ground plane), and common cathode 1062.

Figures 10C, 10D:
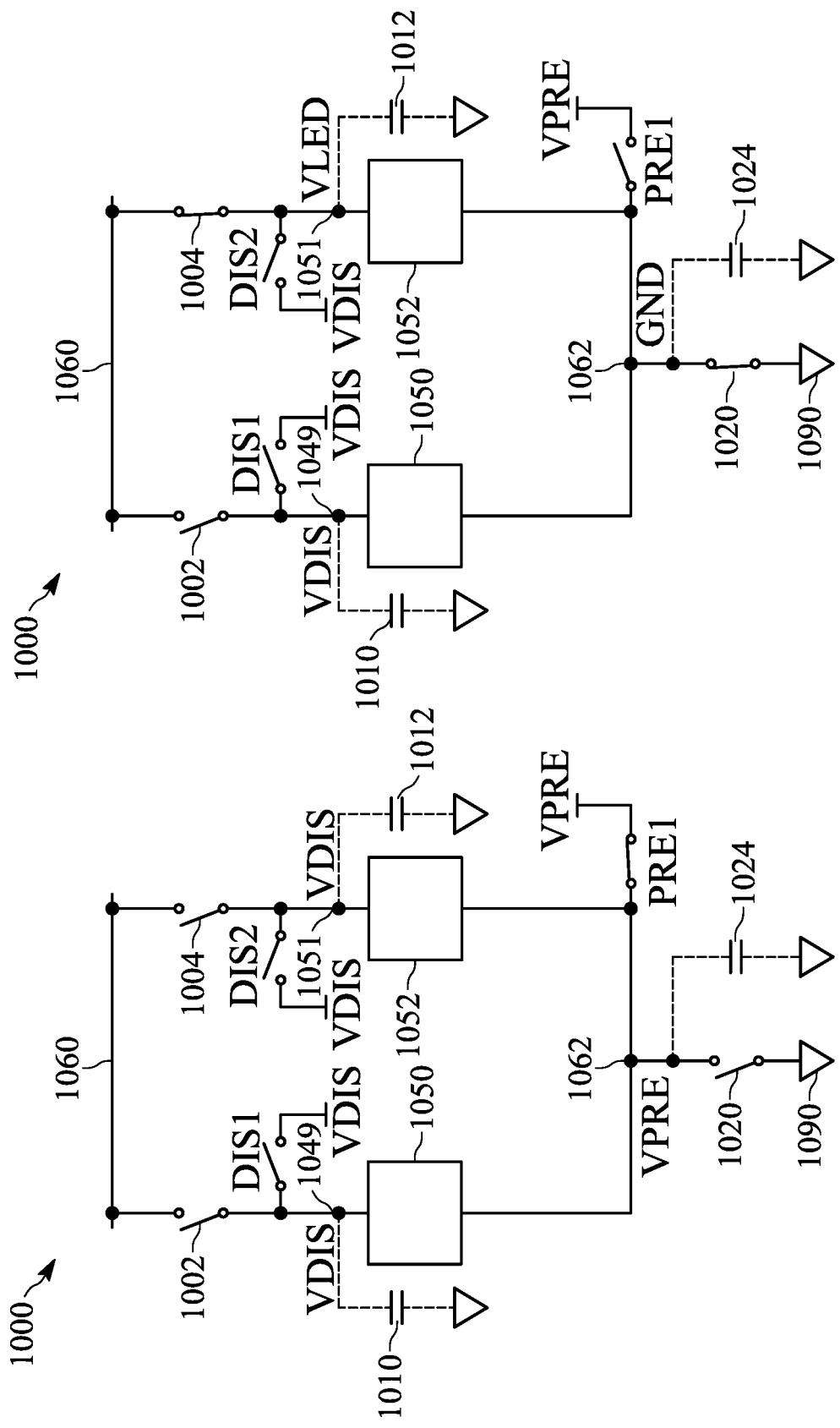

For a first circuit configuration of FIG. 10A, switches 1002 and 1020 are closed while switches 1004, DIS1, DIS2, and PRE1 are open. This results in a supply voltage (e.g., $V_{LED}$) of power supply 1060 forming at common anode 1049 of the display pixel region 1050. For a second circuit configuration of FIG. 10B, the switches 1002, 1004, and 1020 are open while discharge switches DIS1 and DIS2 are closed. This results in the supply voltage (e.g., $V_{LED}$) at common anode 1049 and 1051 being discharged to $V_{DIS}$. For a third circuit configuration of FIG. 10C, the switches 1002, 1004, 1020, DIS1, DIS2 are open. A switch precharge PRE1 switch is closed to precharge common cathode 1062 to $V_{PRE}$. $V_{DIS}$ is maintained at separate anodes 1049 and 1051. Anode 1049 is common for the LEDs of the display region 1050 and anode 1051 is common for the LEDs of the display region 1052.

For a fourth circuit configuration of FIG. 10D, the switches 1002, DIS1, DIS2, and PRE1 are open while switches 1004 and 1020 are closed. This results in the supply voltage (e.g., $V_{LED}$) being formed at anode 1051 of the display pixel region 1052, ground voltage level at common cathode 1062, and intended illumination of display pixel region 1052. An undesired current path 580 and ghosting effect are prevented due to the discharge of common anode 1049 with switch DIS1 before turning switches 1004 and 1020 ON (closing switches 1004 and 1020).

The display circuitry 900 can be optimized to reduce power consumption in comparison to the display circuitry 700 and 800.

Power=$V^2*f*C$, with V (e.g., $V_{DIS}$, $V_{PRE}$) to be optimized, f (operating frequency) is fixed by acoustics, C (Capacitance) is printed circuit board dependent.

If $V_{DIS}$=0 volts and $V_{PRE}$=power supply voltage ($V_{LED}$), then display circuitry 900 has 710 mW of power consumption. Optimized $V_{DIS}$ and $V_{PRE}$ based on overall voltage headroom and brightness setting can reduce power consumption to 90 mW in one example.

In one embodiment, $V_{DIS}$ is optimized with the following equation:

$V_{DIS}$—ground reference voltage< a threshold voltage level for turning OFF LEDs(or causing no illumination).

$V_{PRE}$ can be optimized with the following equation:

$$V_{LED} - V_{PRE} < \text{a threshold voltage level for turning OFF LEDs(or causing no illumination)}.$$

In another embodiment, $V_{PRE}$ is optimized based on dynamically changing in accordance with voltage changes in $V_{LED}$. FIG. 11A illustrates voltage timing diagrams for $V_{LED}$ and $V_{PRE}$. A voltage timing diagram 1120 shows how the voltage level for $V_{LED}$ changes with time. In response to any change in the voltage level for $V_{LED}$, the voltage level for $V_{PRE}$ level changes in a similar manner as illustrated with a voltage timing diagram 1130. For example, $V_{PRE}$ can follow $V_{LED}$ with a fixed absolute voltage. For example, it can be 6V or 8V difference between $V_{PRE}$ and $V_{LED}$.

Figure 11B:
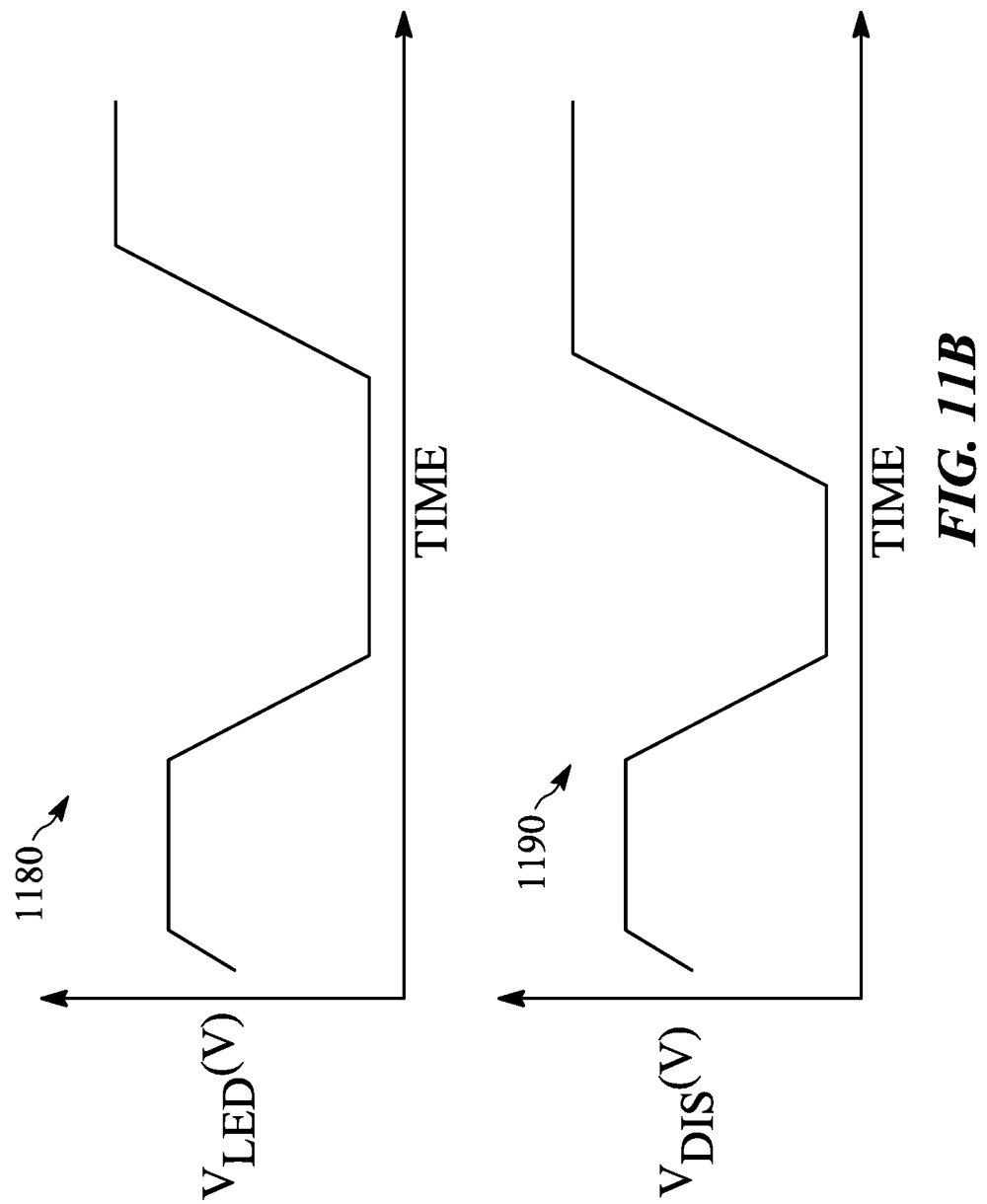

In another embodiment, $V_{DIS}$ is optimized based on dynamically changing in accordance with voltage changes in $V_{LED}$. FIG. 11B illustrates voltage timing diagrams for $V_{LED}$ and $V_{DIS}$. A voltage timing diagram 1180 shows how the voltage level for $V_{LED}$ changes with time. In response to any change in the voltage level for $V_{LED}$, the voltage level for $V_{DIS}$ level changes in a similar manner as illustrated with a voltage timing diagram 1190. For example, VD's can follow $V_{LED}$ with a fixed absolute voltage. For example, it can be 6V or 8V difference between $V_{DIS}$ and $V_{LED}$. The same power supply can be used for both $V_{PRE}$ and $V_{DIS}$.

Figure 13:
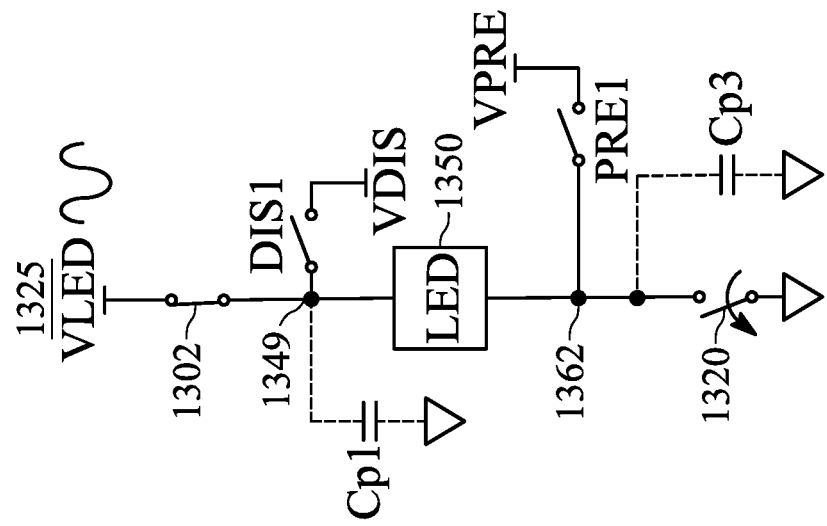
FIG. 13 illustrates display circuitry in accordance with one embodiment.

FIGS. 11C-11D illustrate voltage timing diagrams for row driver signals and $V_{DIS}$. A row driver signal (e.g., $V_{LED}$ signal 1325 from display circuitry 1300 of FIG. 13) is applied to LED region 1350 when switch 1302 is closed. In one example, $V_{DIS}$ is decoupled from common anode 1349 of LED region 1350 with switch DIS1 prior or immediately prior to the row driver signal being coupled to the common anode. $V_{DIS}$ is coupled to common anode 1349 of LED region 1350 after (as illustrated in FIG. 11C) or immediately after (as illustrated in FIG. 11D) the row driver signal is decoupled or removed from the common anode. Row driver signals and $V_{DIS}$ should not be ON at the same time. Simultaneous switching is acceptable for the row driver signals and $V_{DIS}$.

Figure 12:
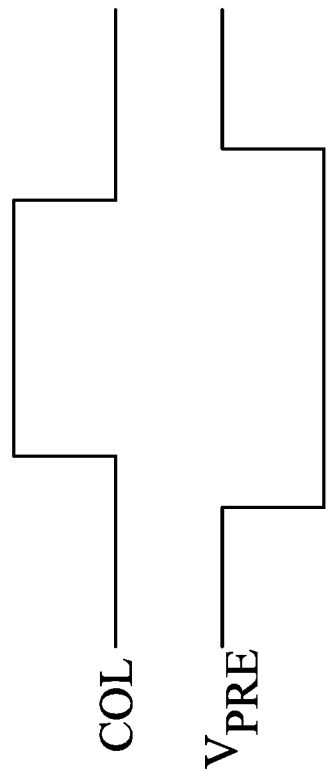
FIG. 12 illustrates voltage timing diagrams for a column driver signal and $V_{PRE}$.

FIG. 12 illustrates voltage timing diagrams for a column driver signal and $V_{PRE}$. A column driver signal is applied to LED region 1350 when switch 1320 is closed. In one example, $V_{PRE}$ is decoupled from common cathode 1362 of LED region 1350 with switch PRE1 prior or just prior to the column driver signal being coupled to the common cathode. $V_{PRE}$ is coupled to common cathode 1362 of LED region 1350 after or immediately after the column driver signal is decoupled or removed from the common cathode. Column driver signals and $V_{PRE}$ should not be ON at the same time. Simultaneous switching is acceptable for the column driver signals and $V_{PRE}$.

In one example, $V_{PRE}$ is turned ON soon after the column driver signal is turned OFF to prevent ripples on $V_{LED}$ from turning LEDs back on again. Additionally, $V_{PRE}$ is turned ON soon after the column driver signal is turned OFF to avoid cathodes being left floating for long durations. For shorter PWM pulses, $V_{PRE}$ should still be turned ON/OFF at same time as column driver signals to align with all other columns that are in pulse-amplitude modulation mode in order to minimize column-to-column crosstalk.

The cancellation architecture of the present design (e.g., FIGS. 7A-7D, 8A-8D, 9A-9D) can be modified and have alternative implementations. For example, the cancellation architecture can be modified to have a current source positioned between a LED region (e.g., 750, 752, 850, 852, 950, 952) and a ground reference point (or ground plane). In another example, a current source can be positioned between a power supply (e.g., 760, 860, 960) and a LED region (e.g., 750, 752, 850, 852, 950, 952). In another example, the power supply (e.g., 760, 860, 960) is replaced with a ground reference point, the ground reference point (e.g., 790, 890, 990) is replaced with a negative power supply (e.g., $-V_{LED}$), and a current source can be positioned between a LED region (e.g., 750, 752, 850, 852, 950, 952) and the negative power supply.

In accordance with various aspects of the subject disclosure, an electronic device with a display is provided. The display includes a first array of light-emitting diodes of a backlight unit to generate backlight for the display with each LED including an anode and a cathode and a first switch to selectively couple a power supply voltage to a common anode of the first array of LEDs to control illumination of the first array of LEDs. A first discharge switch to selectively couple a first voltage level to the common anode of the first array of LEDs to discharge the common anode to prevent an undesired current path through the first array of LEDs and associated undesired illumination.

In one example of the various aspects of the subject disclosure, the electronic device further includes driver circuitry coupled to the first array of the LEDs. The driver circuitry is configured to generate drive signals for causing illumination of the first array of LEDs when the first switch couples the power supply voltage to the common anode.

In another example of the various aspects of the subject disclosure, the first voltage level comprises a ground voltage level.

In another example of the various aspects of the subject disclosure, the first voltage level comprises a voltage level that is sufficient to discharge the common anode to a voltage level that is less than a threshold voltage level for illuminating the first array of LEDs.

In another example of the various aspects of the subject disclosure, the first discharge switch comprises a tri-state switch having a high impedance state, a first logic state, and a second logic state.

In another example of the various aspects of the subject disclosure, the first array of LEDs has an undesired parasitic capacitance that causes an undesired charge of the common anode after the first switch couples the power supply voltage to the common anode and then decouples the power supply voltage from the common anode.

In another example of the various aspects of the subject disclosure, the electronic device, further includes a second array of light-emitting diodes (LEDs) of the backlight unit to generate backlight for the display with each LED including an anode and a cathode, a second switch to selectively couple the power supply voltage to a common anode of the second array of LEDs to control illumination of the second array of LEDs, and a second discharge switch to selectively couple a second voltage level to the common anode of the second array of LEDs to discharge the common anode to prevent an undesired current path through the second array of LEDs and associated undesired illumination.

In another example of the various aspects of the subject disclosure, the electronic device further includes a first precharge switch to selectively couple a third voltage level or LED power supply to a common cathode of the first and second arrays of LEDs to pre-charge the common cathode to prevent an undesired current path through the second array of LEDs and associated undesired illumination.

In accordance with other aspects of the subject disclosure, a display circuitry, comprises a first array of light emitting diodes (LEDs) having controllable brightness levels, a first switch to selectively couple a power supply voltage to a common anode of the first array of LEDs to control illumination of the first array of LEDs, and a first discharge switch to selectively couple a first discharge voltage level to the common anode of the first array of LEDs to discharge the common anode to prevent an undesired current path through the first array of LEDs that is caused by parasitic capacitance.

In one example of other aspects of the subject disclosure, the first discharge voltage level is designed to reduce power consumption with the first discharge voltage level being less than a threshold voltage level for causing illumination of the first array of LEDs and the first discharge voltage level being greater than a ground reference voltage.

In another example of other aspects of the subject disclosure, the first discharge switch comprises a tri-state switch having a high impedance state, a first logic state, and a second logic state.

In another example of other aspects of the subject disclosure, the first array of LEDs has the parasitic capacitance that causes an undesired charge of the common anode after the first switch couples the power supply voltage to the common anode and then decouples the power supply voltage from the common anode.

In another example of other aspects of the subject disclosure, the display circuitry further includes a second array of light-emitting diodes (LEDs) having controllable brightness levels with each LED including an anode and a cathode, a second switch to selectively couple the power supply voltage to a common anode of the second array of LEDs to control illumination of the second array of LEDs, and a second discharge switch to selectively couple a second discharge voltage level to the common anode of the second array of LEDs to discharge the common anode to prevent an undesired current path through the second array of LEDs and associated undesired illumination.

In another example of other aspects of the subject disclosure, the second discharge voltage level is designed to reduce power consumption with the second discharge voltage level being less than a threshold voltage level for causing illumination of the second array of LEDs and the second discharge voltage level being greater than a ground reference voltage.

In another example of other aspects of the subject disclosure, the display circuitry further includes a precharge switch to selectively couple a precharge voltage level to a common cathode of both the first and second arrays of LEDs to pre-charge the common cathode to prevent an undesired current path through the second array of LEDs and associated undesired illumination.

In another example of other aspects of the subject disclosure, the precharge voltage level is designed to reduce power consumption with the precharge voltage level being based on the power supply voltage and a threshold voltage level causing illumination of the second array of LEDs.

In accordance with other aspects of the subject disclosure, an electronic device comprises an array of light-emitting diodes (LEDs), a precharge switch to selectively couple a dynamically changing precharge voltage level to a common cathode of the array of LEDs to pre-charge the common cathode to prevent an undesired current path through the array of LEDs, and driver circuitry coupled to the array of LEDs. The driver circuitry is configured to generate drive signals to control the array of the light-emitting diodes.

In one example of other aspects of the subject disclosure, the precharge voltage level is designed to reduce power consumption based on dynamically changing in response to a change in power supply voltage.

In another example of other aspects of the subject disclosure, the precharge voltage level is based on the power supply voltage and a threshold voltage level causing illumination of the array of LEDs.

In another example of other aspects of the subject disclosure, the electronic device further includes a switch to selectively couple a power supply voltage to a common anode of the array of LEDs to control illumination of the array of LEDs and a discharge switch to selectively couple a discharge voltage level to a common anode of the array of LEDs to discharge the common anode to prevent an undesired current path through the array of LEDs that is caused by parasitic capacitance.

In another example of other aspects of the subject disclosure, the discharge voltage level is designed to reduce power consumption with the discharge voltage level being less than a threshold voltage level for causing illumination of the array of LEDs and the discharge voltage level being greater than a ground reference voltage.

In another example of other aspects of the subject disclosure, the driver circuitry is configured to generate driver signals including a row driver signal that is coupled and decoupled from the common anode of the array of LEDs.

In another example of other aspects of the subject disclosure, the discharge voltage level is decoupled from the common anode of the array of LEDs with the discharge switch prior or just prior to the row driver signal being coupled to the common anode. The discharge voltage level is coupled to common anode after or immediately after the row driver signal is decoupled or removed from the common anode.

In another example of other aspects of the subject disclosure, the driver circuitry is configured to generate driver signals including a column driver signal that is coupled and decoupled from the common cathode of the array of LEDs.

In another example of other aspects of the subject disclosure, the precharge voltage level is decoupled from the common cathode of the array of LEDs with the precharge switch prior or just prior to the column driver signal being coupled to the common cathode. The precharge voltage level is coupled to the common cathode after or immediately after the column driver signal is decoupled or removed from the common anode.

Various functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "processor", and "memory" all refer to electronic or other technological devices. These terms exclude people or groups of people. For the purposes of the specification, the terms "display" or "displaying" means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device as described herein for displaying information to the user and a keyboard and a pointing device, such as a mouse or a trackball, by which the user can provide input to the computer. Other kinds of devices can be used to provide for interaction with a user as well; for example, feedback provided to the user can be any form of sensory feedback, such as visual feedback, auditory feedback, or tactile feedback; and input from the user can be received in any form, including acoustic, speech, or tactile input.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Some of the blocks may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "example" is used herein to mean "serving as an example or illustration." Any aspect or design described herein as "example" is not necessarily to be construed as preferred or advantageous over other aspects or design.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. An electronic device with a display, the display comprising:
   a first array of light-emitting diodes (LEDs) of a backlight unit to generate backlight for the display with each LED including an anode and a cathode;
   a first switch to selectively couple a power supply voltage to a common anode of the first array of LEDs to control illumination of the first array of LEDs; and
   a first discharge switch to selectively couple a first voltage level to the common anode of the first array of LEDs to discharge the common anode to prevent an undesired current path through the first array of LEDs and associated undesired illumination;
   a second array of light-emitting diodes (LEDs) of the backlight unit to generate backlight for the display with each LED including an anode and a cathode;
   a second switch to selectively couple the power supply voltage to a common anode of the second array of LEDs to control illumination of the second array of LEDs;
   a second discharge switch to selectively couple a second voltage level to the common anode of the second array of LEDs to discharge the common anode to prevent an undesired current path through the second array of LEDs and associated undesired illumination; and
   a first precharge switch to selectively couple a third voltage level or LED power supply to a common cathode of the first and second arrays of LEDs to pre-charge the common cathode to prevent the undesired current path through the second array of LEDs and associated undesired illumination.

2. The electronic device of claim 1, further comprising: driver circuitry coupled to the first array of the LEDs, wherein the driver circuitry is configured to generate drive signals for causing illumination of the first array of LEDs when the first switch couples the power supply voltage to the common anode.

3. The electronic device of claim 1, wherein the first voltage level comprises a ground voltage level.

4. The electronic device of claim 1, wherein the first voltage level comprises a voltage level that is sufficient to discharge the common anode to a voltage level that is less than a threshold voltage level for illuminating the first array of LEDs.

5. The electronic device of claim 1, wherein the first discharge switch comprises a tri-state switch having a high impedance state, a first logic state, and a second logic state.

6. The electronic device of claim 1, wherein the first array of LEDs has an undesired parasitic capacitance that causes an undesired charge of the common anode after the first switch couples the power supply voltage to the common anode and then decouples the power supply voltage from the common anode.

7. The electronic device of claim 1, wherein for a circuit configuration the first switch is open while the first discharge switch is closed to discharge the common anode.

8. A display circuitry, comprising:
   a first array of light emitting diodes (LEDs) having controllable brightness levels;
   a first switch to selectively couple a power supply voltage to a common anode of the first array of LEDs to control illumination of the first array of LEDs;
   a first discharge switch to selectively couple a first discharge voltage level to the common anode of the first array of LEDs to discharge the common anode to prevent an undesired current path through the first array of LEDs that is caused by parasitic capacitance;
   a second array of light-emitting diodes (LEDs) having controllable brightness levels with each LED including an anode and a cathode;
   a second switch to selectively couple the power supply voltage to a common anode of the second array of LEDs to control illumination of the second array of LEDs;
   a second discharge switch to selectively couple a second discharge voltage level to the common anode of the second array of LEDs to discharge the common anode to prevent an undesired current path through the second array of LEDs and associated undesired illumination; and
   a precharge switch to selectively couple a precharge voltage level to a common cathode of both the first and second arrays of LEDs to pre-charge the common cathode to prevent an undesired current path through the second array of LEDs and associated undesired illumination.

9. The display circuitry of claim 8, wherein the first discharge voltage level is designed to reduce power consumption with the first discharge voltage level being less than a threshold voltage level for causing illumination of the first array of LEDs and the first discharge voltage level being greater than a ground reference voltage.

10. The display circuitry of claim 8, wherein the first discharge switch comprises a tri-state switch having a high impedance state, a first logic state, and a second logic state.

11. The display circuitry of claim 8, wherein the first array of LEDs has the parasitic capacitance that causes an undesired charge of the common anode after the first switch couples the power supply voltage to the common anode and then decouples the power supply voltage from the common anode.

12. The display circuitry of claim 8, wherein for a circuit configuration of the display circuitry the first switch is open while the first discharge switch is closed to discharge the common anode.

13. The display circuitry of claim 8, wherein the second discharge voltage level is designed to reduce power consumption with the second discharge voltage level being less than a threshold voltage level for causing illumination of the second array of LEDs and the second discharge voltage level being greater than a ground reference voltage.

14. The display circuitry of claim 8, wherein the precharge voltage level is designed to reduce power consumption with the precharge voltage level being based on the power supply voltage and a threshold voltage level causing illumination of the second array of LEDs.

15. An electronic device, comprising:
an array of light-emitting diodes (LEDs);
a precharge switch to selectively couple a dynamically changing precharge voltage level to a common cathode of the array of LEDs to pre-charge the common cathode to prevent an undesired current path through the array of LEDs;
driver circuitry coupled to the array of LEDs, wherein the driver circuitry is configured to generate drive signals to control the array of the light-emitting diodes;
a switch to selectively couple a power supply voltage to a common anode of the array of LEDs to control illumination of the array of LEDs; and
a discharge switch to selectively couple a discharge voltage level to a common anode of the array of LEDs to discharge the common anode to prevent an undesired current path through the array of LEDs that is caused by parasitic capacitance.

16. The electronic device of claim 15, wherein the precharge voltage level is designed to reduce power consumption based on dynamically changing in response to a change in power supply voltage.

17. The electronic device of claim 16, wherein the precharge voltage level is based on the power supply voltage and a threshold voltage level causing illumination of the array of LEDs.

18. The electronic device of claim 15, wherein the discharge voltage level is designed to reduce power consumption with the discharge voltage level being less than a threshold voltage level for causing illumination of the array of LEDs and the discharge voltage level being greater than a ground reference voltage.

19. The electronic device of claim 15, wherein the driver circuitry is configured to generate driver signals including a row driver signal that is coupled and decoupled from the common anode of the array of LEDs.

20. The electronic device of claim 19, wherein the discharge voltage level is decoupled from the common anode of the array of LEDs with the discharge switch prior or just prior to the row driver signal being coupled to the common anode, wherein the discharge voltage level is coupled to common anode after or immediately after the row driver signal is decoupled or removed from the common anode.

21. The electronic device of claim 15, wherein the driver circuitry is configured to generate driver signals including a column driver signal that is coupled and decoupled from the common cathode of the array of LEDs.

22. The electronic device of claim 21, wherein the precharge voltage level is decoupled from the common cathode of the array of LEDs with the precharge switch prior or just prior to the column driver signal being coupled to the common cathode, wherein the precharge voltage level is coupled to the common cathode after or immediately after the column driver signal is decoupled or removed from the common anode.

* * * * *